US012279234B2

(12) United States Patent
Li

(10) Patent No.: US 12,279,234 B2
(45) Date of Patent: Apr. 15, 2025

(54) METHOD AND APPARATUS OF HANDLING PARTIAL SENSING FOR SIDELINK COMMUNICATION IN A WIRELESS COMMUNICATION SYSTEM

(71) Applicant: ASUSTek Computer Inc., Taipei (TW)

(72) Inventor: Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 264 days.

(21) Appl. No.: 17/826,941

(22) Filed: May 27, 2022

(65) Prior Publication Data

US 2022/0400469 A1 Dec. 15, 2022

Related U.S. Application Data

(60) Provisional application No. 63/208,286, filed on Jun. 8, 2021, provisional application No. 63/208,306, filed on Jun. 8, 2021.

(51) Int. Cl.
*H04W 72/02* (2009.01)
*H04W 72/08* (2009.01)
*H04W 72/541* (2023.01)

(52) U.S. Cl.
CPC ......... *H04W 72/02* (2013.01); *H04W 72/541* (2023.01)

(58) Field of Classification Search
CPC ............................. H04W 72/02; H04W 72/082
See application file for complete search history.

(56) References Cited

U.S. PATENT DOCUMENTS

| 11,026,120 | B2 | 6/2021 | Khoryaev et al. | |
|---|---|---|---|---|
| 2023/0199725 | A1* | 6/2023 | Ko | H04W 92/18 370/329 |
| 2023/0337187 | A1* | 10/2023 | Ye | H04W 52/0235 |
| 2024/0188044 | A1* | 6/2024 | Miao | H04W 72/0446 |

(Continued)

OTHER PUBLICATIONS

Notice of Office Action received from the Korean Intellectual Property Office in corresponding KR Application No. 10-2022-0065315, dated Nov. 19, 2024.

(Continued)

*Primary Examiner* — Derrick V Rose
(74) *Attorney, Agent, or Firm* — Blue Capital Law Firm, P.C.

(57) ABSTRACT

A method and apparatus are disclosed for a device to perform sidelink communication. The device triggers or requests to perform partial sensing-based resource selection in a first Transmission Time Interval (TTI) in a sidelink resource pool. The device also derives or determines a set of candidate TTIs within a resource selection window in response to the trigger or request, wherein sidelink resources in the set of candidate TTIs are candidate sidelink resources. Furthermore, when the device does not perform sensing in a second TTI, the device excludes a number of candidate sidelink resources, from the candidate sidelink resources, associated with the second TTI, wherein the second TTI is after the first TTI and before the first candidate TTI of the set of candidate TTIs. The device further derives or determines a set of sidelink resources, from the candidate sidelink resources at least excluding the number of candidate sidelink resources.

18 Claims, 12 Drawing Sheets

(56) References Cited

U.S. PATENT DOCUMENTS

2024/0244584 A1* 7/2024 Li .......................... H04W 72/02
2024/0244648 A1* 7/2024 Ko .......................... H04W 4/40

OTHER PUBLICATIONS

ASUSTeK, "Discussion on partial sensing and SL DRX impact", Agenda Item: 8.11.1.1, Document for Discussion and Decision, R1-2105845, 3GPP TSG RAN WG1 #105-e, e-Meeting, May 10-27, 2021.

Moderator (Oppo), "FL summary for AI 8.11.1.1-resource allocation for power saving (final)", Agenda Item: 8.11.1.1, Document for Discussion and Decision, R1-2104093, 3GPP TSG RAN WG1 #104b-e, e-Meeting, Apr. 12-20, 2021.

* cited by examiner

|  | $P_{step}$ |
|---|---|
| TDD with UL/DL configuration 0 | 60 |
| TDD with UL/DL configuration 1 | 40 |
| TDD with UL/DL configuration 2 | 20 |
| TDD with UL/DL configuration 3 | 30 |
| TDD with UL/DL configuration 4 | 20 |
| TDD with UL/DL configuration 5 | 10 |
| TDD with UL/DL configuration 6 | 50 |
| Otherwise | 100 |

FIG. 5 (PRIOR ART)

| $\mu_{SL}$ | $T^{SL}_{proc,0}$ [slots] |
|---|---|
| 0 | 1 |
| 1 | 1 |
| 2 | 2 |
| 3 | 4 |

FIG. 6 (PRIOR ART)

| $\mu_{SL}$ | $T^{SL}_{proc,1}$ [slots] |
|---|---|
| 0 | 3 |
| 1 | 5 |
| 2 | 9 |
| 3 | 17 |

FIG. 7 (PRIOR ART)

| Value of 2nd-stage SCI format field | 2nd-stage SCI format |
|---|---|
| 00 | SCI format 2-A |
| 01 | SCI format 2-B |
| 10 | Reserved |
| 11 | Reserved |

FIG. 8 (PRIOR ART)

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

FIG. 9 (PRIOR ART)

METHOD AND APPARATUS OF HANDLING PARTIAL SENSING FOR SIDELINK COMMUNICATION IN A WIRELESS COMMUNICATION SYSTEM

CROSS-REFERENCE TO RELATED APPLICATIONS

The present Application claims the benefit of U.S. Provisional Patent Application Ser. Nos. 63/208,286 and 63/208,306 filed on Jun. 8, 2021, the entire disclosures of which are incorporated herein in their entirety by reference.

FIELD

This disclosure generally relates to wireless communication networks, and more particularly, to a method and apparatus of handling partial sensing for sidelink communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are for a device to perform sidelink communication. In one embodiment, the device triggers or requests to perform partial sensing-based resource selection in a first Transmission Time Interval (TTI) in a sidelink resource pool. The device also derives or determines a set of candidate TTIs within a resource selection window in response to the trigger or request, wherein sidelink resources in the set of candidate TTIs are candidate sidelink resources. Furthermore, when the device does not perform sensing in a second TTI, the device excludes a number of candidate sidelink resources, from the candidate sidelink resources, associated with the second TTI, wherein the second TTI is after the first TTI and before the first candidate TTI of the set of candidate TTIs. In addition, the device derives or determines a set of sidelink resources, from the candidate sidelink resources at least excluding the number of candidate sidelink resources. The device also selects one or more sidelink resources from the set of sidelink resources. Furthermore, the device performs one or more sidelink transmission on the one or more sidelink resources for transmitting a first sidelink data.

BRIEF DESCRIPTION OF THE DRAWINGS

FIG. 5 is a reproduction of Table 14.1.1-1 of 3GPP TS 36.213 V16.5.0.

FIG. 6 is a reproduction of Table 8.1.4-1 of 3GPP TS 38.214 V16.5.0.

FIG. 7 is a reproduction of Table 8.1.4-2 of 3GPP TS 38.214 V16.5.0.

FIG. 8 is a reproduction of Table 8.3.1.1-1 of 3GPP TS 38.212 V16.5.0.

FIG. 9 is a reproduction of Table 8.4.1.1-1 of 3GPP TS 38.212 V16.5.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 36.213 V16.5.0, "E-UTRA; Physical layer procedures (Release 16)"; TS 38.214 V16.5.0, "NR; Physical layer procedures for data (Release 16)"; TS 38.213 V16.5.0, "NR; Physical layer procedures for control (Release 16)"; TS 38.212 V16.5.0, "NR; Multiplexing and channel coding (Release 16)"; TS 38.321 V16.4.0, "NR; Medium Access Control (MAC) protocol specification (Release 16)"; RP-202846, "WID revision: NR sidelink enhancement", LG Electronics; R2-2100001, "Report of 3GPP TSG RAN2 #112-e meeting, Online"; R1-2102281, "Final Report of 3GPP TSG RAN WG1 #104-e v1.0.0 (Online meeting, 25th Jan.-5th Feb. 2021)"; RAN1 Chair's Notes of 3GPP TSG RAN WG1 #105-e; and TS 38.331 V16.4.1, "NR; Radio Resource Control (RRC) protocol specification (Release 16)". The standards and documents listed above are hereby expressly incorporated by reference in their entirety.

Figure 1:
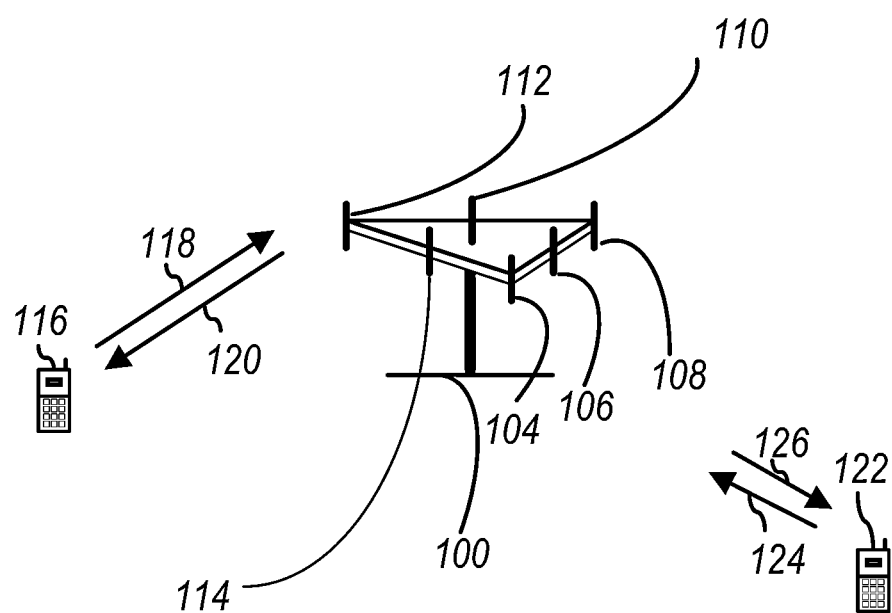
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
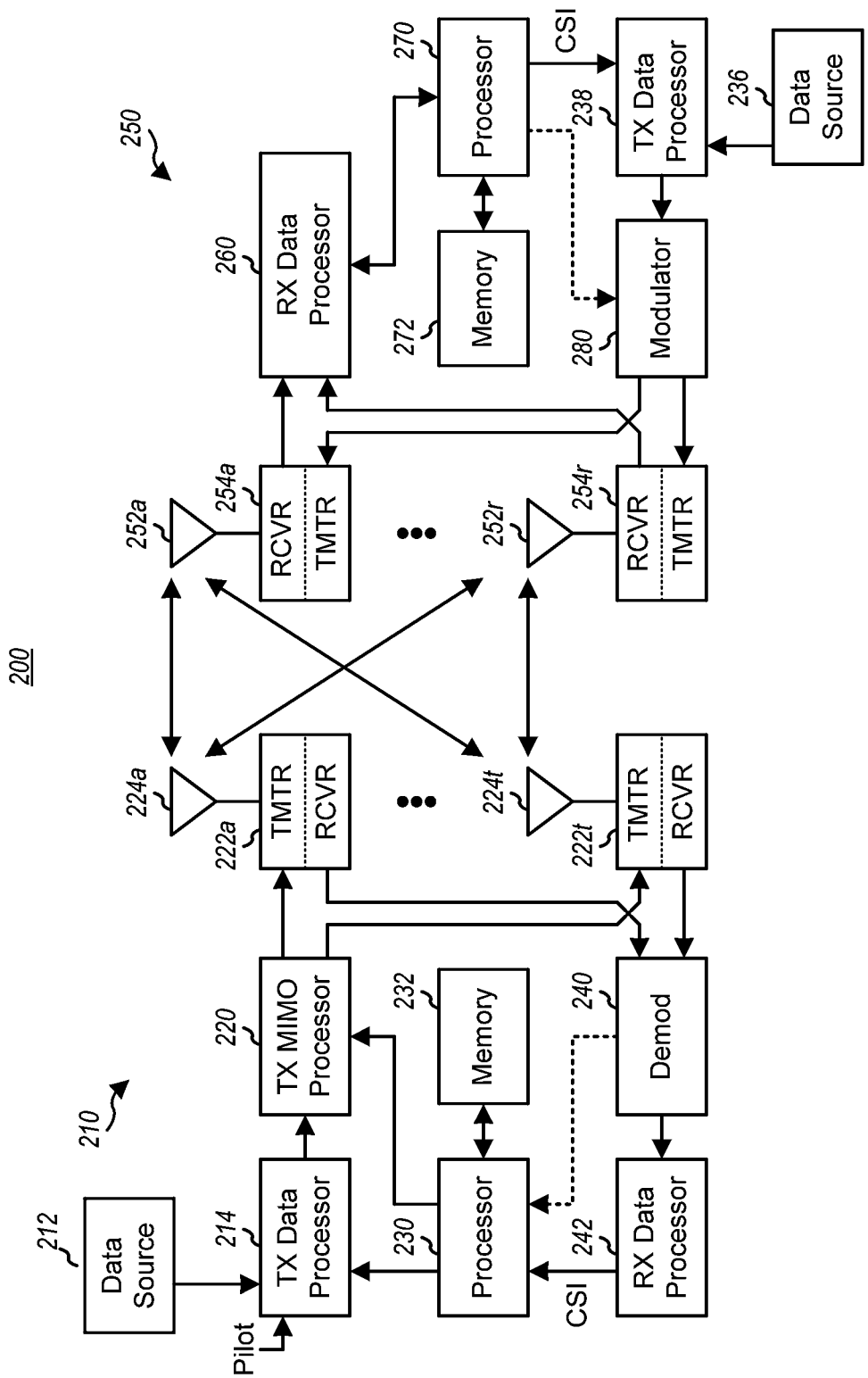
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
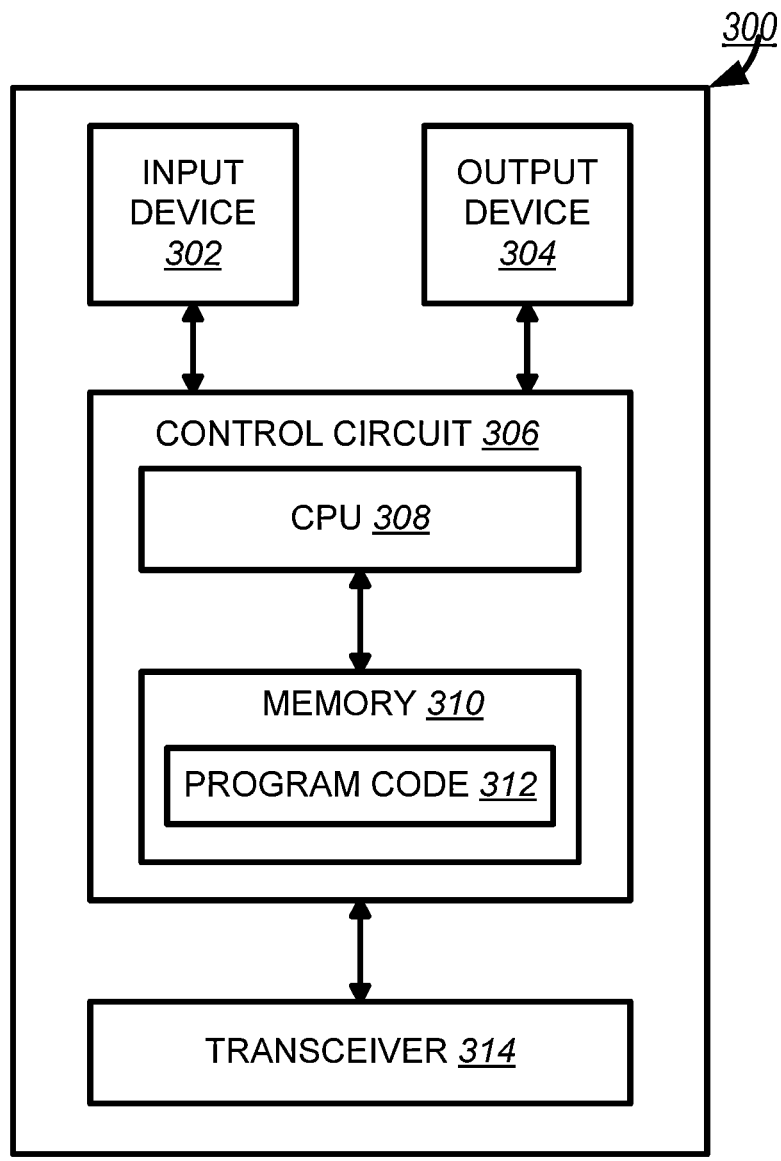
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the NR system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
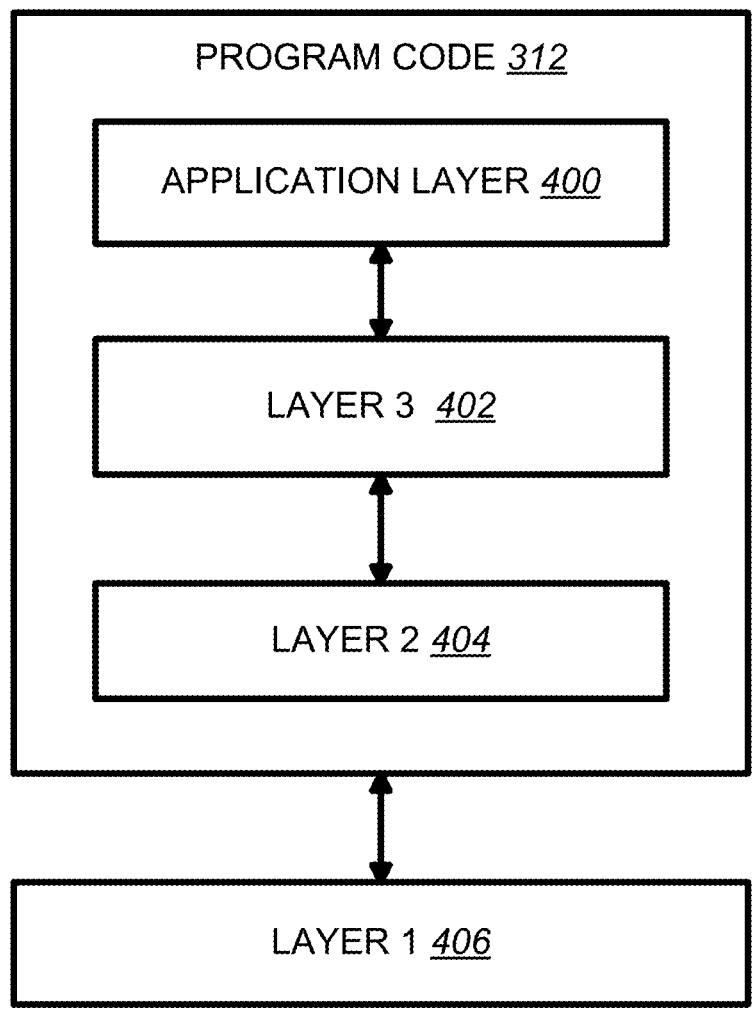
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP TS 36.213 specifies Physical sidelink shared channel related procedure in LTE as shown below. For acquiring sidelink resources, 3GPP TS 36.213 specifies partial sensing for sidelink transmission mode 4 as shown below.

14.1 Physical Sidelink Shared Channel Related Procedures
14.1.1 UE Procedure for Transmitting the PSSCH If the UE transmits SCI format 1 on PSCCH according to a PSCCH resource configuration in subframe n, then for the corresponding PSSCH transmissions of one TB
for sidelink transmission mode 3,
  the set of subframes and the set of resource blocks are determined using the subframe pool indicated by the PSSCH resource configuration (described in Clause 14.1.5) and using "Retransmission index and Time gap between initial transmission and retransmission" field and "Frequency resource location of the initial transmission and retransmission" field in the SCI format 1 as described in Clause 14.1.1.4A.
for sidelink transmission mode 4,
  the set of subframes and the set of resource blocks are determined using the subframe pool indicated by the PSSCH resource configuration (described in Clause 14.1.5) and using "Retransmission index and Time gap between initial transmission and retransmission" field and "Frequency resource location of the initial transmission and retransmission" field in the SCI format 1 as described in Clause 14.1.1.4B.
For sidelink transmission mode 3 and 4, the parameter $P_{step}$ is given by table 14.1.1-1.
[Table 14.1.1-1 of 3GPP TS 36.213 V16.5.0, entitled "Determination of $P_{step}$ for sidelink transmission mode 3 and 4", is reproduced as FIG. 5]

14.1.1.6 UE procedure for determining the subset of resources to be reported to higher layers in PSSCH resource selection in sidelink transmission mode 4 and in sensing measurement in sidelink transmission mode 3

In sidelink transmission mode 4, when requested by higher layers in subframe n for a carrier, the UE shall determine the set of resources to be reported to higher layers for PSSCH transmission according to the steps described in this Clause. Parameters $L_{subCH}$ the number of sub-channels to be used for the PSSCH transmission in a subframe, $P_{rsvp\_TX}$ the resource reservation interval, and $prio_{TX}$ the priority to be transmitted in the associated SCI format 1 by the UE are all provided by higher layers (described in [8]). $C_{resel}$ is determined according to Clause 14.1.1.4B.

In sidelink transmission mode 3, when requested by higher layers in subframe n for a carrier, the UE shall determine the set of resources to be reported to higher layers in sensing measurement according to the steps described in this Clause. Parameters $L_{subCH}$, $P_{rsvp\_TX}$ and $prio_{TX}$ are all provided by higher layers (described in [11]). $C_{resel}$ is determined by $C_{resel}=10*SL\_RESOURCE\_RESELECTION\_COUNTER$, where SL_RESOURCE_RESELECTION_COUNTER is provided by higher layers [11].

If partial sensing is not configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, ..., $L_{subCH}$−1. The UE shall assume that any set of $L_{subCH}$ contiguous sub-channels included in the corresponding PSSCH resource pool (described in 14.1.5) within the time interval [n+T$_1$,n+T$_2$] corresponds to one candidate single-subframe resource, where selections of T$_1$ and T$_2$ are up to UE implementations under T$_1$≤4 and T$_{2min}$(prio$_{TX}$)≤T$_2$≤100, if T$_{2min}$(prio$_{TX}$) is provided by higher layers for prio$_{TX}$, otherwise 20≤T$_2$≤100. UE selection of T$_2$ shall fulfil the latency requirement. The total number of the candidate single-subframe resources is denoted by $M_{total}$.

2) The UE shall monitor subframes $t_{n'-10 \times P_{step}}^{SL}$, $t_{n'-10 \times P_{step}+1}^{SL}$, ..., $t_{n'-1}^{SL}$ except for those in which its transmissions occur, where $t_{n'}^{SL}$=n if subframe n belongs to the set ($t_0^{SL}, t_1^{SL}, \ldots, t_{T_{max}}^{SL}$), otherwise subframe $t_{n'}^{SL}$ is the first subframe after subframe n belonging to the set ($t_0^{SL}, t_1^{SL}, \ldots, t_{T_{max}}^{SL}$). The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=(a−1)*8+b.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:
  the UE has not monitored subframe $t_z^{SL}$ in Step 2.
  there is an integer j which meets $y+j \times P'_{rsvp\_TX}=z+P_{step} \times k \times q$ where j=0, 1, ..., $C_{resel}$−1, $P'_{rsvp\_TX}=P_{step} \times P_{rsvp\_TX}/100$, k is any value allowed by the higher layer parameter restrictResourceReservationPeriod and q=1,2, ...,Q. Here, $$Q = \frac{1}{k} \text{ if } k < 1$$

and n'−z≤$P_{step} \times$k, where $t_{n'}^{SL}$=n if subframe n belongs to the set $t_0^{SL}, t_1^{SL}, \ldots, t_{T_{max}}^{SL}$, otherwise subframe $t_{n'}^{SL}$ is the first subframe belonging to the set to $t_0^{SL}, t_1^{SL}, \ldots, t_{T_{max}}^{SL}$ after subframe n; and Q=1 otherwise.

6) The UE shall exclude any candidate single-subframe resource from the set $S_A$ if it meets all the following conditions:
  the UE receives an SCI format 1 in subframe $t_m^{SL}$, and "Resource reservation" field and "Priority" field in the received SCI format 1 indicate the values $P_{rsvp\_RX}$ and prio$_{RX}$, respectively according to Clause 14.2.1.
  PSSCH-RSRP measurement according to the received SCI format 1 is higher than $Th_{prio_{TX},prio_{RX}}$.
  the SCI format received in subframe $t_m^{SL}$ or the same SCI format 1 which is assumed to be received in subframe(s) $t_{m+q \times P_{step} \times P_{rsvp\_RX}}^{SL}$ determines according to 14.1.1.4C the set of resource blocks and subframes which overlaps with $$R_{x,y+j \times P'_{rsvp\_TX}}$$

for q=1,2, ..., Q and j=0, 1, ..., $C_{resel}$−1. Here, $$Q = \frac{1}{P_{rsvp\_RX}} \text{ if } P_{rsvp\_RX} < 1$$

and n'−m≤$P_{step} \times P_{rsvp\_RX}$, where $t_{n'}^{SL}$=n if subframe n belongs to the set ($t_0^{SL}, t_1^{SL}, \ldots, t_{T_{max}}^{SL}$), otherwise subframe $t_{n'}^{SL}$ is the first subframe after subframe n belonging to the set ($t_0^{SL}, t_1^{SL}, \ldots, t_{T_{max}}^{SL}$); otherwise Q=1.

7) If the number of candidate single-subframe resources remaining in the set $S_A$ is smaller than 0.2·$M_{total}$, then Step 4 is repeated with $Th_{a,b}$ increased by 3 dB.

8) For a candidate single-subframe resource $R_{x,y}$ remaining in the set $S_A$, the metric $E_{x,y}$ is defined as the linear average of S-RSSI measured in sub-channels x+k for k=0, ..., $L_{subCH}$−1 in the monitored subframes in Step 2 that can be expressed by $$t_{y-P_{step}*j}^{SL}$$

for a non-negative integer j if $P_{rsvp\_TX}$≥100, and $$t_{y-P'_{rsvp\_TX}*j}^{SL}$$

for a non-negative integer j otherwise.

9) The UE moves the candidate single-subframe resource with the smallest metric $E_{x,y}$ from the set $S_A$ to $S_B$. This step is repeated until the number of candidate single-subframe resources in the set $S_B$ becomes greater than or equal to 0.2·$M_{total}$.

10) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.

If partial sensing is configured by higher layers then the following steps are used:

1) A candidate single-subframe resource for PSSCH transmission $R_{x,y}$ is defined as a set of $L_{subCH}$ contiguous sub-channels with sub-channel x+j in subframe $t_y^{SL}$ where j=0, ..., $L_{subCH}$−1. The UE shall determine by its implementation a set of subframes which consists of at least Y subframes within the time interval [n+$T_1$,n+$T_2$] where selections of $T_1$ and $T_2$ are up to UE implementations under $T_1$≤4 and $T_{2min}(prio_{TX})$ ≤$T_2$≤100, if $T_{2min}(prio_{TX})$ is provided by higher layers for $prio_{TX}$, otherwise 20≤$T_2$≤100. UE selection of $T_2$ shall fulfil the latency requirement and Y shall be greater than or equal to the high layer parameter minNumCandidateSF. The UE shall assume that any set of $L_{subCH}$ contiguous sub-channels included in the corresponding PSSCH resource pool (described in 14.1.5) within the determined set of subframes correspond to one candidate single-subframe resource. The total number of the candidate single-subframe resources is denoted by $M_{total}$.

2) If a subframe $t_y^{SL}$ is included in the set of subframes in Step 1, the UE shall monitor any subframe $t_{y-k \times P_{step}}^{SL}$ if k-th bit of the high layer parameter gapCandidateSensing is set to 1. The UE shall perform the behaviour in the following steps based on PSCCH decoded and S-RSSI measured in these subframes.

3) The parameter $Th_{a,b}$ is set to the value indicated by the i-th SL-ThresPSSCH-RSRP field in SL-ThresPSSCH-RSRP-List where i=(a−1)*8+b.

4) The set $S_A$ is initialized to the union of all the candidate single-subframe resources. The set $S_B$ is initialized to an empty set.

5) The UE shall exclude any candidate single-subframe resource $R_{x,y}$ from the set $S_A$ if it meets all the following conditions:

the UE receives an SCI format 1 in subframe $t_m^{SL}$, and "Resource reservation" field and "Priority" field in the received SCI format 1 indicate the values $P_{rsvp\_RX}$ and $prio_{RX}$, respectively according to Clause 14.2.1.

PSSCH-RSRP measurement according to the received SCI format 1 is higher than $Th_{prio_{TX},prio_{RX}}$.

the SCI format received in subframe $t_m^{SL}$ or the same SCI format 1 which is assumed to be received in subframe(s)

$$t_{m+q \times P_{step} \times P_{rsvp\_RX}}^{SL}$$

determines according to 14.1.1.4C the set of resource blocks and subframes which overlaps with $$R_{x,y+j \times P'_{rsvp\_TX}}$$

for q=1, 2, ..., Q and j=0, 1, ..., $C_{resel}$−1. Here, $$Q = \frac{1}{P_{rsvp\_RX}} \text{ if } P_{rsvp\_RX} < 1$$

and y'−m≤$P_{step} \times P_{rsvp\_RX}+P_{step}$, where $t_y^{SL}$ is the last subframe of the Y subframes, and Q=1 otherwise.

6) If the number of candidate single-subframe resources remaining in the set $S_A$ is smaller than 0.2·$M_{total}$, then Step 4 is repeated with $Th_{a,b}$ increased by 3 dB.

7) For a candidate single-subframe resource $R_{x,y}$ remaining in the set $S_A$, the metric $E_{x,y}$ is defined as the linear average of S-RSSI measured in sub-channels x+k for k=0, ..., $L_{subCH}$−1 in the monitored subframes in Step 2 that can be expressed by $$t_{y-P_{step}*j}^{SL}$$

for a non-negative integer j.

8) The UE moves the candidate single-subframe resource $R_{x,y}$ with the smallest metric $E_{x,y}$ from the set $S_A$ to $S_B$. This step is repeated until the number of candidate single-subframe resources in the set $S_B$ becomes greater than or equal to $0.2 \cdot M_{total}$.

9) When the UE is configured by upper layers to transmit using resource pools on multiple carriers, it shall exclude a candidate single-subframe resource $R_{x,y}$ from $S_B$ if the UE does not support transmission in the candidate single-subframe resource in the carrier under the assumption that transmissions take place in other carrier(s) using the already selected resources due to its limitation in the number of simultaneous transmission carriers, its limitation in the supported carrier combinations, or interruption for RF retuning time [10].

The UE shall report set $S_B$ to higher layers.

3GPP TS 38.214 specifies Physical sidelink shared channel related procedure in NR as shown below. For acquiring sidelink resources, 3GPP TS 38.214 specifies sidelink resource allocation mode 1 and sidelink resource allocation mode 2 as shown below.

8. Physical Sidelink Shared Channel Related Procedures

A UE can be configured by higher layers with one or more sidelink resource pools. A sidelink resource pool can be for transmission of PSSCH, as described in Clause 8.1, or for reception of PSSCH, as described in Clause 8.3 and can be associated with either sidelink resource allocation mode 1 or sidelink resource allocation mode 2.

In the frequency domain, a sidelink resource pool consists of sl-NumSubchannel contiguous sub-channels. A sub-channel consists of sl-SubchannelSize contiguous PRBs, where sl-NumSubchannel and sl-SubchannelSize are higher layer parameters.

The set of slots that may belong to a sidelink resource pool is denoted by $(t_0^{SL}, t_1^{SL}, \ldots, t_{T_{max}-1}^{SL})$ where $0 \leq t_i^{SL} < 10240 \times 2^\mu$, $0 \leq i < T_{max}$, the slot index is relative to slot #0 of the radio frame corresponding to SFN 0 of the serving cell or DFN 0, the set includes all the slots except the following slots, $N_{S\_SSB}$ slots in which S-SS/PSBCH block (S-SSB) is configured, $N_{nonSL}$ slots in each of which at least one of Y-th, (Y+1)-th, ..., (Y+X−1)-th OFDM symbols are not semi-statically configured as UL as per the higher layer parameter tdd-UL-DL-ConfigurationCommon-r16 of the serving cell if provided or sl-TDD-Configuration-r16 if provided or sl-TDD-Config-r16 of the received PSBCH if provided, where Y and X are set by the higher layer parameters sl-StartSymbol and sl-LengthSymbols, respectively.

The reserved slots which are determined by the following steps.

1) the remaining slots excluding $N_{S\_SSB}$ slots and $N_{nonSL}$ slots from the set of all the slots are denoted by $$(l_0, l_1, \ldots, l_{(10240 \times 2^\mu - N_{S_{SSB}} - N_{nonSL} - 1)})$$

arranged in increasing order of slot index.

2) a slot $l_r (0 \leq r < 10240 \times 2^\mu - N_{S_{SSB}} - N_{nonSL})$ belongs to the reserved slots if $$r = \left\lfloor \frac{m \cdot (10240 \times 2^\mu - N_{S_{SSB}} - N_{nonSL})}{N_{reserved}} \right\rfloor,$$

here $m = 0, 1, \ldots, N_{reserved} - 1$ and $N_{reserved} = (10240 \times 2^\mu - N_{S_{SSB}} - N_{nonSL}) \bmod L_{bitmap}$ where $L_{bitmap}$ denotes the length of bitmap configured by higher layers.

The slots in the set are arranged in increasing order of slot index.

The UE determines the set of slots assigned to a sidelink resource pool as follows:

a bitmap $(b_0, b_1, \ldots, b_{L_{bitmap}-1})$ associated with the resource pool is used where $L_{bitmap}$ the length of the bitmap is configured by higher layers.

a slot $t_k^{SL}$ $(0 \leq k < 10240 \times 2^\mu - N_{S_{SSB}} - N_{nonSL} - N_{reserved})$ belongs to the set if $b_{k'} = 1$ where $k' = k \bmod L_{bitmap}$.

The slots in the set are re-indexed such that the subscripts i of the remaining slots $t'^{SL}_i$ are successive $\{0, 1, \ldots, T'_{max} - 1\}$ where $T'_{max}$ is the number of the slots remaining in the set.

The UE determines the set of resource blocks assigned to a sidelink resource pool as follows:

The resource block pool consists of $N_{PRB}$ PRBs.

The sub-channel m for $m = 0, 1, \ldots$, numSubchannel−1 consists of a set of $n_{subCHsize}$ contiguous resource blocks with the physical resource block number $n_{PRB} = n_{subCHRBstart} + m \cdot n_{subCHsize} + j$ for $j = 0, 1, \ldots, n_{subCHsize} - 1$, where $n_{subCHRBstart}$ and $n_{subCHsize}$ are given by higher layer parameters sl-StartRB-Subchannel and sl-SubchannelSize, respectively A UE is not expected to use the last $N_{PRB} \bmod n_{subCHsize}$ PRBs in the resource pool.

8.1 UE Procedure for Transmitting the Physical Sidelink Shared Channel

Each PSSCH transmission is associated with an PSCCH transmission.

That PSCCH transmission carries the $1^{st}$ stage of the SCI associated with the PSSCH transmission; the $2^{nd}$ stage of the associated SCI is carried within the resource of the PSSCH.

If the UE transmits SCI format 1-A on PSCCH according to a PSCCH resource configuration in slot n and PSCCH resource m, then for the associated PSSCH transmission in the same slot one transport block is transmitted with up to two layers;

The number of layers (u) is determined according to the 'Number of DMRS port' field in the SCI;

The set of consecutive symbols within the slot for transmission of the PSSCH is determined according to clause 8.1.2.1;

The set of contiguous resource blocks for transmission of the PSSCH is determined according to clause 8.1.2.2;

8.1.2.1 Resource Allocation in Time Domain

The UE shall transmit the PSSCH in the same slot as the associated PSCCH.

The minimum resource allocation unit in the time domain is a slot.

The UE shall transmit the PSSCH in consecutive symbols within the slot, subject to the following restrictions:

The UE shall not transmit PSSCH in symbols which are not configured for sidelink. A symbol is configured for sidelink, according to higher layer parameters startSLsymbols and lengthSLsymbols, where startSLsymbols is the symbol index of the first symbol of lengthSLsymbols consecutive symbols configured for sidelink.

Within the slot, PSSCH resource allocation starts at symbol startSLsymbols+1.

The UE shall not transmit PSSCH in symbols which are configured for use by PSFCH, if PSFCH is configured in this slot.

The UE shall not transmit PSSCH in the last symbol configured for sidelink.

The UE shall not transmit PSSCH in the symbol immediately preceding the symbols which are configured for use by PSFCH, if PSFCH is configured in this slot.

8.1.2.2 Resource Allocation in Frequency Domain

The resource allocation unit in the frequency domain is the sub-channel.

The sub-channel assignment for sidelink transmission is determined using the "Frequency resource assignment" field in the associated SCI.

The lowest sub-channel for sidelink transmission is the sub-channel on which the lowest PRB of the associated PSCCH is transmitted.

If a PSSCH scheduled by a PSCCH would overlap with resources containing the PSCCH, the resources corresponding to a union of the PSCCH that scheduled the PSSCH and associated PSCCH DM-RS are not available for the PSSCH.

8.1.4 UE Procedure for Determining the Subset of Resources to be Reported to Higher Layers in PSSCH Resource Selection in Sidelink Resource Allocation Mode 2

In resource allocation mode 2, the higher layer can request the UE to determine a subset of resources from which the higher layer will select resources for PSSCH/PSCCH transmission. To trigger this procedure, in slot n, the higher layer provides the following parameters for this PSSCH/PSCCH transmission:

the resource pool from which the resources are to be reported;
  L1 priority, $prio_{Tx}$;
  the remaining packet delay budget;
  the number of sub-channels to be used for the PSSCH/PSCCH transmission in a slot, $L_{subCH}$;
  optionally, the resource reservation interval, $P_{rsvp\_TX}$, in units of msec.
  if the higher layer requests the UE to determine a subset of resources from which the higher layer will select resources for PSSCH/PSCCH transmission as part of re-evaluation or pre-emption procedure, the higher layer provides a set of resources $(r_0, r_1, r_2, \ldots)$ which may be subject to re-evaluation and a set of resources $(r'_0, r'_1, r'_2, \ldots)$ which may be subject to pre-emption.
  it is up to UE implementation to determine the subset of resources as requested by higher layers before or after the slot $r''_i - T_3$, where $r''_i$ is the slot with the smallest slot index among $(r_0, r_1, r_2, \ldots)$ and $(r'_0, r'_1, r'_2, \ldots)$, and $T_3$ is equal to $T_{proc,1}^{SL}$, where $T_{proc,1}^{SL}$ is defined in slots in Table 8.1.4-2 where $\mu_{SL}$ is the SCS configuration of the SL BWP.

The following higher layer parameters affect this procedure:

sl-SelectionWindowList: internal parameter $T_{2min}$ is set to the corresponding value from higher layer parameter sl-SelectionWindowList for the given value of $prio_{Tx}$.
  sl-ThresPSSCH-RSRP-List: this higher layer parameter provides an RSRP threshold for each combination $(p_i, p_j)$, where $p_i$ is the value of the priority field in a received SCI format 1-A and $p_j$ is the priority of the transmission of the UE selecting resources; for a given invocation of this procedure, $p_j = prio_{TX}$.
  sl-RS-ForSensing selects if the UE uses the PSSCH-RSRP or PSCCH-RSRP measurement, as defined in clause 8.4.2.1.
  sl-ResourceReservePeriodList
  sl-SensingWindow: internal parameter $T_0$ is defined as the number of slots corresponding to sl-SensingWindow msec
  sl-TxPercentageList: internal parameter X for a given $prio_{Tx}$ is defined as sl-TxPercentageList $(prio_{Tx})$ converted from percentage to ratio
  sl-PreemptionEnable: if sl-PreemptionEnable is provided, and if it is not equal to 'enabled', internal parameter $prio_{pre}$ is set to the higher layer provided parameter sl-PreemptionEnable The resource reservation interval, $P_{rsvp\_TX}$, if provided, is converted from units of msec to units of logical slots, resulting in $P'_{rsvp\_TX}$ according to clause 8.1.7.

Notation:

$(t'^{SL}_0, t'^{SL}_1, t'^{SL}_2, \ldots)$ denotes the set of slots which belongs to the sidelink resource pool and is defined in Clause 8.

The following steps are used:

1) A candidate single-slot resource for transmission $R_{x,y}$ is defined as a set of $L_{subCH}$ contiguous sub-channels with sub-channel $x+j$ in slot $t'^{SL}_y$ where $j=0, \ldots, L_{subCH}-1$. The UE shall assume that any set of $L_{subCH}$ contiguous sub-channels included in the corresponding resource pool within the time interval $[n+T_1, n+T_2]$ correspond to one candidate single-slot resource, where
   selection of $T_1$ is up to UE implementation under $0 \leq T_1 \leq T_{proc,1}^{SL}$, where $T_{proc,1}^{SL}$ is defined in slots in Table 8.1.4-2 where $\mu^{SL}$ is the SCS configuration of the SL BWP;
   if $T_{2min}$ is shorter than the remaining packet delay budget (in slots) then $T_2$ is up to UE implementation subject to $T_{2min} \leq T_2 \leq$ remaining packet budget (in slots); otherwise $T_2$ is set to the remaining packet delay budget (in slots).

The total number of candidate single-slot resources is denoted by $M_{total}$.

2) The sensing window is defined by the range of slots $[n-T_0, n-T_{proc,0}^{SL})$ where $T_0$ is defined above and $T_{proc,0}^{SL}$ is defined in slots in Table 8.1.4-1 where $\mu^{SL}$ is the SCS configuration of the SL BWP. The UE shall monitor slots which belongs to a sidelink resource pool within the sensing window except for those in which its own transmissions occur. The UE shall perform the behaviour in the following steps based on PSCCH decoded and RSRP measured in these slots.

3) The internal parameter $Th(p_i, p_j)$ is set to the corresponding value of RSRP threshold indicated by the i-th field in sl-ThresPSSCH-RSRP-List, where $i = p_i + (p_j-1)*8$.

4) The set $S_A$ is initialized to the set of all the candidate single-slot resources.

5) The UE shall exclude any candidate single-slot resource $R_{x,y}$ from the set $S_A$ if it meets all the following conditions:
   the UE has not monitored slot $t'^{SL}_m$ in Step 2.
   for any periodicity value allowed by the higher layer parameter sl-ResourceReservePeriodList and a hypothetical SCI format 1-A received in slot $t'^{SL}_m$ with 'Resource reservation period' field set to that periodicity value and indicating all subchannels of the resource pool in this slot, condition c in step 6 would be met.

6) The UE shall exclude any candidate single-slot resource $R_{x,y}$ from the set $S_A$ if it meets all the following conditions:
   a) the UE receives an SCI format 1-A in slot $t'^{SL}_m$, and 'Resource reservation period' field, if present, and 'Priority' field in the received SCI format 1-A indicate the values $P_{rsvp\_RX}$ and $prio_{RX}$, respectively according to Clause 16.4 in [6, TS 38.213];

b) the RSRP measurement performed, according to clause 8.4.2.1 for the received SCI format 1-A, is higher than $\text{Th}(\text{prio}_{RX},\text{prio}_{TX})$;

c) the SCI format received in slot $t'^{SL}_m$ or the same SCI format which, if and only if the 'Resource reservation period' field is present in the received SCI format 1-A, is assumed to be received in slot(s)

$$t'^{SL}_{m+q\times P'_{rsvp\_RX}}$$

determines according to clause 8.1.5 the set of resource blocks and slots which overlaps with $$R_{x,y+j\times P'_{rsvp\_TX}}$$

for q=1, 2, ..., Q and j=0, 1, ..., $C_{resel}$−1. Here, $P'_{rsvp\_RX}$ is $P_{rsvp\_RX}$ converted to units of logical slots according to clause 8.1.7, $$Q = \left\lceil \frac{T_{scal}}{P_{rsvp\_RX}} \right\rceil$$

if $P_{rsvp\_RX} < T_{scal}$ and n′−m≤$P'_{rsvp\_RX}$, where $t'^{SL}_n$=n if slot n belongs to the set $(t'^{SL}_0, t'^{SL}_1, \ldots, t'^{SL}_{T'_{max}-1})$, otherwise slot $t'^{SL}_n$ is the first slot after slot n belonging to the set $(t'^{SL}_0, t'^{SL}_1, \ldots, t'^{SL}_{T'_{max}-1})$; otherwise Q=1. $T_{scal}$ is set to selection window size $T_2$ converted to units of msec.

7) If the number of candidate single-slot resources remaining in the set $S_A$ is smaller than $X \cdot M_{total}$, then $\text{Th}(p_i, p_j)$ is increased by 3 dB for each priority value $\text{Th}(p_i, p_j)$ and the procedure continues with step 4.

The UE shall report set $S_A$ to higher layers.

If a resource $r_i$ from the set $(r_0, r_1, r_2, \ldots)$ is not a member of $S_A$, then the UE shall report re-evaluation of the resource $r_i$ to higher layers.

If a resource $r'_i$ from the set $(r'_0, r'_1, r'_2, \ldots)$ meets the conditions below then the UE shall report pre-emption of the resource $r'_i$ to higher layers $r'^i$ is nota member of S, and $r'_i$ meets the conditions for exclusion in step 6, with $\text{Th}(\text{prio}_{RX},\text{prio}_{TX})$ set to the final threshold after executing steps 1)-7), i.e. including all necessary increments for reaching $X \cdot M_{total}$, and the associated priority $\text{prio}_{RX}$, satisfies one of the following conditions:

sl-PreemptionEnable is provided and is equal to 'enabled' and $\text{prio}_{TX} > \text{prio}_{RX}$ sl-PreemptionEnable is provided and is not equal to 'enabled', and $\text{prio}_{RX} < \text{prio}_{pre}$ and $\text{prio}_{TX} > \text{prio}_{RX}$

[Table 8.1.4-1 of 3GPP TS 38.214 V16.5.0, Entitled "$T^{SL}_{proc,0}$ Depending on Sub-Carrier Spacing", is Reproduced as FIG. 6]

[Table 8.1.4-2 of 3GPP TS 38.214 V16.5.0, Entitled "$T^{SL}_{proc,1}$ Depending on Sub-Carrier Spacing", is Reproduced as FIG. 7]

8.1.5 UE Procedure for Determining Slots and Resource Blocks for PSSCH Transmission Associated with an SCI Format 1-A The set of slots and resource blocks for PSSCH transmission is determined by the resource used for the PSCCH transmission containing the associated SCI format 1-A, and fields 'Frequency resource assignment', 'Time resource assignment' of the associated SCI format 1-A as described below.

'Time resource assignment' carries logical slot offset indication of N=1 or 2 actual resources when sl-MaxNumPerReserve is 2, and N=1 or 2 or 3 actual resources when sl_MaxNumPerReserve is 3, in a form of time RIV (TRIV) field which is determined as follows:

--- if N = 1
 TRIV = 0
elseif N = 2
 TRIV = $t_1$
else
 if $(t_2 - t_1 - 1) \le 15$
  TRIV = $30(t_2 - t_1 - 1) + t_1 + 31$
 else
  TRIV = $30(31 - t_2 + t_1) + 62 - t_1$
 end if
end if

--- where the first resource is in the slot where SCI format 1-A was received, and $t_i$ denotes i-th resource time offset in logical slots of a resource pool with respect to the first resource where for N=2, $1 \le t_1 \le 31$; and for N=3, $1 \le t_1 \le 30$, $t_1 < t_2 \le 31$.

The starting sub-channel $n_{subCH,0}^{start}$ of the first resource is determined according to clause 8.1.2.2. The number of contiguously allocated sub-channels for each of the N resources $L_{subCH} \ge 1$ and the starting sub-channel indexes of resources indicated by the received SCI format 1-A, except the resource in the slot where SCI format 1-A was received, are determined from "Frequency resource assignment" which is equal to a frequency RIV (FRIV) where.

If sl-MaxNumPerReserve is 2 then $$\text{FRIV}=n_{subCH,1}^{start}+\Sigma_{i=1}^{L_{subCH}-1}(N_{subchannel}^{SL}+1-i)$$

If sl-MaxNumPerReserve is 3 then $$\text{FRIV}=n_{subCH,1}^{start}+n_{subCH,2}^{start}\cdot(N_{subchannel}^{SL}+1-L_{subCH})+\Sigma_{i=1}^{L_{subCH}-1}(N_{subchannel}^{SL}+1-i)^2$$

where $n_{subCH,1}^{start}$ denotes the starting sub-channel index for the second resource $n_{subCH,2}^{start}$ denotes the starting sub-channel index for the third resource $N_{subchannel}^{SL}$ is the number of sub-channels in a resource pool provided according to the higher layer parameter sl-NumSubchannel If TRIV indicates N<sl-MaxNumPerReserve, the starting sub-channel indexes corresponding to sl-MaxNumPerReserve minus N last resources are not used.

The number of slots in one set of the time and frequency resources for transmission opportunities of PSSCH is given by $C_{resel}$ where $C_{resel}$=10*SL_RESOURCE_RESELECTION_COUNTER [10, TS 38.321] if configured else $C_{resel}$ is set to 1.

If a set of sub-channels in slot $t'^{SL}_m$ is determined as the time and frequency resource for PSSCH transmission corresponding to the selected sidelink grant (described in [10, TS 38.321]), the same set of sub-channels in slots $$t'^{SL}_{m+j\times P'_{rsvp\_TX}}$$

are also determined tor PSSCH transmissions corresponding to the same sidelink grant where j=1, 2, ..., $C_{resel}$−1, $P_{rsvp\_TX}$, if provided, is converted from units of msec to units of logical slots, resulting in $P'_{rsvp\_TX}$ according to clause 8.1.7, and $(t'_0{}^{SL}, t'_1{}^{SL}, t'_2{}^{SL}, \ldots)$ is determined by Clause 8. Here, $P_{rsvp\_TX}$ is the resource reservation interval indicated by higher layers.

8.3 UE Procedure for Receiving the Physical Sidelink Shared Channel

For sidelink resource allocation mode 1, a UE upon detection of SCI format 1-A on PSCCH can decode PSSCH according to the detected SCI formats 2-A and 2-B, and associated PSSCH resource configuration configured by higher layers. The UE is not required to decode more than one PSCCH at each PSCCH resource candidate.

For sidelink resource allocation mode 2, a UE upon detection of SCI format 1-A on PSCCH can decode PSSCH according to the detected SCI formats 2-A and 2-B, and associated PSSCH resource configuration configured by higher layers. The UE is not required to decode more than one PSCCH at each PSCCH resource candidate.

A UE is required to decode neither the corresponding SCI formats 2-A and 2-B nor the PSSCH associated with an SCI format 1-A if the SCI format 1-A indicates an MCS table that the UE does not support.

3GPP TS 38.213 specifies sidelink control and feedback channel related procedure in NR as follows:

16. UE Procedures for Sidelink

A UE is provided by SL-BWP-Config a BWP for SL transmissions (SL BWP) with numerology and resource grid determined as described in [4, TS 38.211]. For a resource pool within the SL BWP, the UE is provided by sl-NumSubchannel a number of sub-channels where each sub-channel includes a number of contiguous RBs provided by sl-SubchannelSize. The first RB of the first sub-channel in the SL BWP is indicated by sl-StartRB-Subchannel. Available slots for a resource pool are provided by timeresourcepool and occur with a periodicity of 10240 ms. For an available slot without S-SS/PSBCH blocks, SL transmissions can start from a first symbol indicated by sl-StartSymbol and be within a number of consecutive symbols indicated by sl-LengthSymbols. For an available slot with S-SS/PSBCH blocks, the first symbol and the number of consecutive symbols is predetermined.

The UE expects to use a same numerology in the SL BWP and in an active UL BWP in a same carrier of a same cell. If the active UL BWP numerology is different than the SL BWP numerology, the SL BWP is deactivated.

A priority of a PSSCH according to NR radio access or according to E-UTRA radio access is indicated by a priority field in a respective scheduling SCI format.

16.3 UE Procedure for Reporting HARQ-ACK on Sidelink

A UE can be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period, a number of slots in a resource pool for a period of PSFCH transmission occasion resources. If the number is zero, PSFCH transmissions from the UE in the resource pool are disabled.

A UE expects that a slot $t'_k{}^{SL}(0 \leq k < T'_{max})$ has a PSFCH transmission occasion resource if k mod $N_{PSSCH}^{PSFCH}=0$, where $t'_k{}^{SL}$ is defined in [6, TS 38.214], and $T'_{max}$ is a number of slots that belong to the resource pool within 10240 msec according to [6, TS 38.214], and $N_{PSSCH}^{PSFCH}$ is provided by sl-PSFCH-Period.

A UE may be indicated by higher layers to not transmit a PSFCH in response to a PSSCH reception [11, TS 38.321].

If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH, of the resource pool after a last slot of the PSSCH reception.

16.3.1 UE Procedure for Receiving HARQ-ACK on Sidelink

A UE that transmitted a PSSCH scheduled by a SCI format 2-A or a SCI format 2-B that indicates HARQ feedback enabled, attempts to receive associated PSFCHs according to PSFCH resources determined as described in Clause 16.3. The UE determines an ACK or a NACK value for HARQ-ACK information provided in each PSFCH resource as described in [10, TS 38.133]. The UE does not determine both an ACK value and a NACK value at a same time for a PSFCH resource.

For each PSFCH reception occasion, from a number of PSFCH reception occasions, the UE generates HARQ-ACK information to report to higher layers. For generating the HARQ-ACK information, the UE can be indicated by a SCI format to perform one of the following
  if the UE receives a PSFCH associated with a SCI format 2-A with Cast type indicator field value of "10"
    report to higher layers HARQ-ACK information with same value as a value of HARQ-ACK information that the UE determines from the PSFCH reception
  if the UE receives a PSFCH associated with a SCI format 2-A with Cast type indicator field value of "01"
    report an ACK value to higher layers if the UE determines an ACK value from at least one PSFCH reception occasion from the number of PSFCH reception occasions in PSFCH resources corresponding to every identity $M_{ID}$ of UEs that the UE expects to receive corresponding PSSCHs as described in Clause 16.3; otherwise, report a NACK value to higher layers
  if the UE receives a PSFCH associated with a SCI format 2-B or a SCI format 2-A with Cast type indicator field value of "11"
    report to higher layers an ACK value if the UE determines absence of PSFCH reception for the PSFCH reception occasion; otherwise, report a NACK value to higher layers 16.4 UE Procedure for Transmitting PSCCH A UE can be provided a number of symbols in a resource pool, by sl-TimeResourcePSCCH, starting from a second symbol that is available for SL transmissions in a slot, and a number of PRBs in the resource pool, by sl-FreqResourcePSCCH, starting from the lowest PRB of the lowest sub-channel of the associated PSSCH, for a PSCCH transmission with a SCI format 1-A.

A UE that transmits a PSCCH with SCI format 1-A using sidelink resource allocation mode 2 [6, TS 38.214] sets
  "Resource reservation period" as an index in sl-ResourceReservePeriod1 corresponding to a reservation period provided by higher layers [11, TS 38.321], if the UE is provided sl-MultiReserveResource
  the values of the frequency resource assignment field and the time resource assignment field as described in [6, TS 38.214] to indicate N resources from a set $\{R_y\}$ of resources selected by higher layers as described in [11, TS 38.321] with N smallest slot indices $y_i$ for $0 \leq i \leq N-1$ such that $y_0 < y_1 < \ldots < y_{N-1} \leq y_0 + 31$, where:

N=min($N_{selected}$, $N_{max\_reserve}$), where $N_{selected}$ is a number of resources in the set $\{R_y\}$ with slot indices $y_j$, $0 \leq j \leq N_{selected}-1$, such that $y_0 < y_1 < \ldots < u_{N_{selected}-1} \leq y_0 + 31$, and $N_{max\_reserve}$ is provided by sl-MaxNumPerReserve each resource, from the set of $\{R_y\}$ resources, corresponds to $L_{subCH}$ contiguous sub-channels and a slot in a set of slots $\{t'^{SL}_y\}$, where $L_{subCH}$ is the number of sub-channels available for PSSCH/PSCCH transmission in a slot $(t'^{SL}_0, t'^{SL}_1, t'^{SL}_2, \ldots)$ is a set of slots in a sidelink resource pool [6, TS 38.214]

$y_0$ is an index of a slot where the PSCCH with SCI format 1-A is transmitted.

A UE that transmits a PSCCH with SCI format 1-A using sidelink resource allocation mode 1 [6, TS 38.214] sets the values of the frequency resource assignment field and the time resource assignment field for the SCI format 1-A transmitted in the m-th resource for PSCCH/PSSCH transmission provided by a dynamic grant or by a SL configured grant, where m={1, ..., M} and M is the total number of resources for PCCCH/PSSCH transmission provided by a dynamic grant or the number of resources for PSCCH/PSSCH transmission in a period provided by a SL configured grant type 1 or SL configured grant type 2, as follows:

the frequency resource assignment field and time resource assignment field indicate the m-th to M-th resources as described in [6, TS 38.214].

For decoding of a SCI format 1-A, a UE may assume that a number of bits provided by sl-NumReservedBits can have any value.

3GPP TS 38.212 specifies sidelink control information in NR as follows:

8.3 Sidelink Control Information on PSCCH

SCI carried on PSCCH is a 1st-stage SCI, which transports sidelink scheduling information.

8.3.1 $1^{st}$-stage SCI formats

The fields defined in each of the 1st-stage SCI formats below are mapped to the information bits $a_0$ to $a_{A-1}$ as follows:

Each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

8.3.1.1 SCI Format 1-A

SCI format 1-A is used for the scheduling of PSSCH and 2nd-stage-SCI on PSSCH The following information is transmitted by means of the SCI format 1-A:

Priority—3 bits as specified in clause 5.4.3.3 of [12, TS 23.287] and clause 5.22.1.3.1 of [8, TS 38.321].

Frequency resource assignment $$\left\lceil \log_2 \left( \frac{N^{SL}_{subChannel}(N^{SL}_{subChannel}+1)}{2} \right) \right\rceil$$

bits when the value of the higher layer parameter sl-MaxNumPerReserve is configured to 2; otherwise $$\left\lceil \log_2 \left( \frac{N^{SL}_{subChannel}(N^{SL}_{subChannel}+1)(2N^{SL}_{subChannel}+1)}{6} \right) \right\rceil$$

bits when the value of the higher layer parameter sl-MaxNumPerReserve is configured to 3, as defined in clause 8.1.5 of [6, TS 38.214].

Time resource assignment—5 bits when the value of the higher layer parameter sl-MaxNumPerReserve is configured to 2; otherwise 9 bits when the value of the higher layer parameter sl-MaxNumPerReserve is configured to 3, as defined in clause 8.1.5 of [6, TS 38.214].

Resource reservation period—$\lceil \log_2 N_{rsv\_period} \rceil$ bits as defined in clause 16.4 of [5, TS 38.213], where $N_{rsv\_period}$ is the number of entries in the higher layer parameter sl-ResourceReservePeriodList, if higher layer parameter sl-MultiReserveResource is configured; 0 bit otherwise.

DMRS pattern—$\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.

$2^{nd}$-stage SCI format—2 bits as defined in Table 8.3.1.1-1.

Beta_offset indicator—2 bits as provided by higher layer parameter sl-BetoOffsets2ndSCI and Table 8.3.1.1-2.

Number of DMRS port—1 bit as defined in Table 8.3.1.1-3.

Modulation and coding scheme—5 bits as defined in clause 8.1.3 of [6, TS 38.214].

Additional MCS table indicator—as defined in clause 8.1.3.1 of [6, TS 38.214]: 1 bit if one MCS table is configured by higher layer parameter sl-Additional-MCS-Table; 2 bits if two MCS tables are configured by higher layer parameter sl-Additional-MCS-Table; 0 bit otherwise.

PSFCH overhead indication—1 bit as defined clause 8.1.3.2 of [6, TS 38.214] if higher layer parameter sl-PSFCH-Period=2 or 4; 0 bit otherwise.

Reserved—a number of bits as determined by higher layer parameter sl-NumReservedBits, with value set to zero.

[Table 8.3.1.1-1 of 3GPP TS 38.212 V16.5.0, Entitled "2nd-Stage SCI Formats", is Reproduced as FIG. 8]

8.4 Sidelink Control Information on PSSCH

SCI carried on PSSCH is a 2nd-stage SCI, which transports sidelink scheduling information.

8.4.1 $2^{nd}$-Stage SCI Formats

The fields defined in each of the $2^{nd}$-stage SCI formats below are mapped to the information bits $a_0$ to $a_{A-1}$ as follows:

Each field is mapped in the order in which it appears in the description, with the first field mapped to the lowest order information bit $a_0$ and each successive field mapped to higher order information bits. The most significant bit of each field is mapped to the lowest order information bit for that field, e.g. the most significant bit of the first field is mapped to $a_0$.

8.4.1.1 SCI Format 2-A

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:
  HARQ process number—4 bits.
  New data indicator—1 bit.
  Redundancy version—2 bits as defined in Table 7.3.1.1.1-2.
  Source ID—8 bits as defined in clause 8.1 of [6, TS 38.214].
  Destination ID—16 bits as defined in clause 8.1 of [6, TS 38.214].
  HARQ feedback enabled/disabled indicator—1 bit as defined in clause 16.3 of [5, TS 38.213].
  Cast type indicator—2 bits as defined in Table 8.4.1.1-1 and in clause 8.1 of [6, TS 38.214].
  CSI request—1 bit as defined in clause 8.2.1 of [6, TS 38.214] and in clause 8.1 of [6, TS 38.214].
  [Table 8.4.1.1-1 of 3GPP TS 38.212 V16.5.0, Entitled "Cast Type Indicator", is Reproduced as FIG. 9]

8.4.1.2 SCI Format 2-B

SCI format 2-B is used for the decoding of PSSCH, with HARQ operation when HARQ-ACK information includes only NACK, or when there is no feedback of HARQ-ACK information.

The following information is transmitted by means of the SCI format 2-B:
  HARQ process number—4 bits.
  New data indicator—1 bit.
  Redundancy version—2 bits as defined in Table 7.3.1.1.1-2.
  Source ID—8 bits as defined in clause 8.1 of [6, TS 38.214].
  Destination ID—16 bits as defined in clause 8.1 of [6, TS 38.214].
  HARQ feedback enabled/disabled indicator—1 bit as defined in clause 16.3 of [5, TS 38.213].
  Zone ID—12 bits as defined in clause 5.8.11 of [9, TS 38.331].
  Communication range requirement—4 bits determined by higher layer parameter sl-ZoneConfigMCR-Index.

8.4.5 Multiplexing of Coded $2^{nd}$-Stage SCI Bits to PSSCH

The coded $2^{nd}$-stage SCI bits are multiplexed onto PSSCH according to the procedures in Clause 8.2.1.

3GPP TS 38.321 specifies sidelink-related procedure in Medium Access Control (MAC) layer in NR Uu as follows:

5.22 SL-SCH Data Transfer
5.22.1 SL-SCH Data Transmission
5.22.1.1 SL Grant Reception and SCI Transmission Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SLCS-RNTI with NDI=1 is considered as a dynamic sidelink grant.

If the MAC entity has been configured with Sidelink resource allocation mode 2 to transmit using pool(s) of resources in a carrier as indicated in TS 38.331 [5] or TS 36.331 [21] based on sensing or random selection, the MAC entity shall for each Sidelink process:

NOTE 1: If the MAC entity is configured with Sidelink resource allocation mode 2 to transmit using a pool of resources in a carrier as indicated in TS 38.331 [5] or TS 36.331 [21], the MAC entity can create a selected sidelink grant on the pool of resources based on random selection or sensing only after releasing configured sidelink grant(s), if any.

NOTE 2: The MAC entity expects that PSFCH is always configured by RRC for at least one pool of resources in case that at least a logical channel configured with sl-HARQ-FeedbackEnabled is set to enabled.

1> if the MAC entity has selected to create a selected sidelink grant corresponding to transmissions of multiple MAC PDUs, and SL data is available in a logical channel:
  2> if the MAC entity has not selected a pool of resources allowed for the logical channel:
    3> if sl-HARQ-FeedbackEnabled is set to enabled for the logical channel:
      4> select any pool of resources configured with PSFCH resources among the pools of resources;
    3> else:
      4> select any pool of resources among the pools of resources;
  2> perform the TX resource (re-)selection check on the selected pool of resources as specified in clause 5.22.1.2;

NOTE 3: The MAC entity continuously performs the TX resource (re-)selection check until the corresponding pool of resources is released by RRC or the MAC entity decides to cancel creating a selected sidelink grant corresponding to transmissions of multiple MAC PDUs.

2> if the TX resource (re-)selection is triggered as the result of the TX resource (re-)selection check:
    3> select one of the allowed values configured by RRC in sl-ResourceReservePeriodList and set the resource reservation interval, $P_{rsvp\_TX}$, with the selected value;

NOTE 3A: The MAC entity selects a value for the resource reservation interval which is larger than the remaining PDB of SL data available in the logical channel.

3> randomly select, with equal probability, an integer value in the interval [5, 15] for the resource reservation interval higher than or equal to 100 ms or in the interval $$\left[5 \times \left\lceil \frac{100}{\max(20, P_{rsvp\_TX})} \right\rceil, 15 \times \left\lceil \frac{100}{\max(20, P_{rsvp\_TX})} \right\rceil \right]$$

for the resource reservation interval lower than 100 ms and set SL_RESOURCE_RESELECTION_COUNTER to the selected value;

3> select the number of HARQ retransmissions from the allowed numbers that are configured by RRC in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
    3> select an amount of frequency resources within the range that is configured by RRC between sl-MinSub- ChannelNumPSSCH and sl-MaxSubchannelNumPSSCH included in sl-PSSCH-TxConfigList and, if configured by RRC, overlapped between MinSubChannelNumPSSCH and MaxSubchannelNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;

3> randomly select the time and frequency resources for one transmission opportunity from the resources indicated by the physical layer as specified in clause 8.1.4 of TS 38.214 [7], according to the amount of selected frequency resources and the remaining PDB of SL data available in the logical channel(s) allowed on the carrier.

3> use the randomly selected resource to select a set of periodic resources spaced by the resource reservation interval for transmissions of PSCCH and PSSCH corresponding to the number of transmission opportunities of MAC PDUs determined in TS 38.214 [7];

3> if one or more HARQ retransmissions are selected:
    4> if there are available resources left in the resources indicated by the physical layer according to clause 8.1.4 of TS 38.214 [7] for more transmission opportunities:
        5> randomly select the time and frequency resources for one or more transmission opportunities from the available resources, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources and that a retransmission resource can be indicated by the time resource assignment of a prior SCI according to clause 8.3.1.1 of TS 38.212 [9];
        5> use the randomly selected resource to select a set of periodic resources spaced by the resource reservation interval for transmissions of PSCCH and PSSCH corresponding to the number of retransmission opportunities of the MAC PDUs determined in TS 38.214 [7];
        5> consider the first set of transmission opportunities as the initial transmission opportunities and the other set(s) of transmission opportunities as the retransmission opportunities;
        5> consider the sets of initial transmission opportunities and retransmission opportunities as the selected sidelink grant.

3> else:
    4> consider the set as the selected sidelink grant.

3> use the selected sidelink grant to determine the set of PSCCH durations and the set of PSSCH durations according to TS 38.214 [7].

2> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by RRC in sl-ProbResourceKeep:

3> clear the selected sidelink grant, if available;
    3> randomly select, with equal probability, an integer value in the interval [5, 15] for the resource reservation interval higher than or equal to 100 ms or in the interval $$\left[5 \times \left\lceil \frac{100}{\max(20, P_{rsvp\_TX})} \right\rceil, 15 \times \left\lceil \frac{100}{\max(20, P_{rsvp\_TX})} \right\rceil \right]$$

for the resource reservation interval lower than 100 ms and set SL_RESOURCE_RESELECTION_COUNTER to the selected value;

3> reuse the previously selected sidelink grant for the number of transmissions of the MAC PDUs determined in TS 38.214 [7] with the resource reservation interval to determine the set of PSCCH durations and the set of PSSCH durations according to TS 38.214 [7].

1> if the MAC entity has selected to create a selected sidelink grant corresponding to transmission(s) of a single MAC PDU, and if SL data is available in a logical channel, or a SL-CSI reporting is triggered:
    2> if SL data is available in the logical channel:
        3> if sl-HARQ-FeedbackEnabled is set to enabled for the logical channel:
            4> select any pool of resources configured with PSFCH resources among the pools of resources;
        3> else:
            4> select any pool of resources among the pools of resources;
    2> else if a SL-CSI reporting is triggered:
        3> select any pool of resources among the pools of resources.
    2> perform the TX resource (re-)selection check on the selected pool of resources as specified in clause 5.22.1.2;
    2> if the TX resource (re-)selection is triggered as the result of the TX resource (re-)selection check:
        3> select the number of HARQ retransmissions from the allowed numbers that are configured by RRC in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
        3> select an amount of frequency resources within the range that is configured by RRC between sl-MinSubChannelNumPSSCH and sl-MaxSubChannelNumPSSCH included in sl-PSSCH-TxConfigList and, if configured by RRC, overlapped between sl-MinSubChannelNumPSSCH and sl-MaxSubChannelNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;

3> randomly select the time and frequency resources for one transmission opportunity from the resources indicated by the physical layer as specified in clause 8.1.4 of TS 38.214 [7], according to the amount of selected frequency resources and the remaining PDB of SL data available in the logical channel(s) allowed on the carrier, and the latency requirement of the triggered SL CSI reporting;

3> if one or more HARQ retransmissions are selected:

4> if there are available resources left in the resources indicated by the physical layer according to clause 8.1.4 of TS 38.214 [7] for more transmission opportunities:

5> randomly select the time and frequency resources for one or more transmission opportunities from the available resources, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources, and that a retransmission resource can be indicated by the time resource assignment of a prior SCI according to clause 8.3.1.1 of TS 38.212 [9];

5> consider a transmission opportunity which comes first in time as the initial transmission opportunity and other transmission opportunities as the retransmission opportunities;

5> consider all the transmission opportunities as the selected sidelink grant;

3> else:

4> consider the set as the selected sidelink grant;

3> use the selected sidelink grant to determine PSCCH duration(s) and PSSCH duration(s) according to TS 38.214 [7].

NOTE 3B: If retransmission resource(s) cannot be selected by ensuring that the resource(s) can be indicated by the time resource assignment of a prior SCI, how to select the time and frequency resources for one or more transmission opportunities from the available resources is left for UE implementation by ensuring the minimum time gap between any two selected resources in case that PSFCH is configured for this pool of resources.

1> if a selected sidelink grant is available for retransmission(s) of a MAC PDU which has been positively acknowledged as specified in clause 5.22.1.3.3:

2> clear the PSCCH duration(s) and PSSCH duration(s) corresponding to retransmission(s) of the MAC PDU from the selected sidelink grant.

NOTE 3a: How the MAC entity determines the remaining PDB of SL data is left to UE implementation.

5.22.1.2a Re-Evaluation and Pre-Emption

A resource(s) of the selected sidelink grant for a MAC PDU to transmit from multiplexing and assembly entity is re-evaluated by physical layer at $T_3$ before the slot where the SCI indicating the resource(s) is signalled at first time as specified in clause 8.1.4 of TS 38.214 [7].

A resource(s) of the selected sidelink grant which has been indicated by a prior SCI for a MAC PDU to transmit from multiplexing and assembly entity could be checked for pre-emption by physical layer at $T_3$ before the slot where the resource(s) is located as specified in clause 8.1.4 of TS 38.214 [7].

NOTE 1: It is up to UE implementation to re-evaluate or pre-empt before 'm−$T_3$' or after 'm−$T_3$' but before 'm'. For re-evaluation, m is the slot where the SCI indicating the resource(s) is signalled at first time as specified in clause 8.1.4 of TS 38.214. For pre-emption, m is the slot where the resource(s) is located as specified in clause 8.1.4 of TS 38.214.

If the MAC entity has been configured with Sidelink resource allocation mode 2 to transmit using pool(s) of resources in a carrier as indicated in TS 38.331 [5] or TS 36.331 [21] based on sensing or random selection the MAC entity shall for each Sidelink process:

1> if a resource(s) of the selected sidelink grant which has not been identified by a prior SCI is indicated for re-evaluation by the physical layer as specified in clause 8.1.4 of TS 38.214 [7]; or 1> if any resource(s) of the selected sidelink grant which has been indicated by a prior SCI is indicated for pre-emption by the physical layer as specified in clause 8.1.4 of TS 38.214 [7]:

2> remove the resource(s) from the selected sidelink grant associated to the Sidelink process;

2> randomly select the time and frequency resource from the resources indicated by the physical layer as specified in clause 8.1.4 of TS 38.214 [7] for either the removed resource or the dropped resource, according to the amount of selected frequency resources, the selected number of HARQ retransmissions and the remaining PDB of either SL data available in the logical channel(s) by ensuring the minimum time gap between any two selected resources of the selected sidelink grant in case that PSFCH is configured for this pool of resources, and that a resource can be indicated by the time resource assignment of a SCI for a retransmission according to clause 8.3.1.1 of TS 38.212 [9];

NOTE 2: If retransmission resource(s) cannot be selected by ensuring that the resource(s) can be indicated by the time resource assignment of a prior SCI, how to select the time and frequency resources for one or more transmission opportunities from the available resources is left for UE implementation by ensuring the minimum time gap between any two selected resources in case that PSFCH is configured for this pool of resources.

2> replace the removed or dropped resource(s) by the selected resource(s) for the selected sidelink grant.

NOTE 3: It is left for UE implementation to reselect any pre-selected but not reserved resource(s) during reselection triggered by re-evaluation or pre-emption indicated by the physical layer.

NOTE 4: It is up to UE implementation whether to set the resource reservation interval in the re-selected resource to replace pre-empted resource.

NOTE 5: It is up to UE implementation whether to trigger resource reselection due to deprioritization as specified in clause 16.2.4 of TS 38.213 [6], clause 5.14.1.2.2 of TS 36.321 [22] and clause 5.22.1.3.1a.

3GPP RP-202846 specifies the following Work Item Description (WID) on NR sidelink enhancement:

3 Justification

TSG RAN started discussions in RAN #84 to identify the detailed motivations and work areas for NR sidelink enhancements in Rel-17. Based on the latest summary in RP-192745, significant interest has been observed for the several motivations including the following:

Power saving enables UEs with battery constraint to perform sidelink operations in a power efficient manner. Rel-16 NR sidelink is designed based on the assumption of "always-on" when UE operates sidelink, e.g., only focusing on UEs installed in vehicles with sufficient battery capacity. Solutions for power saving in Rel-17 are required for vulnerable road users (VRUs) in V2X use cases and for UEs in public safety and commercial use cases where power consumption in the UEs needs to be minimized.

Enhanced reliability and reduced latency allow the support of URLLC-type sidelink use cases in wider operation scenarios. The system level reliability and latency performance of sidelink is affected by the communication conditions such as the wireless channel status and the offered load, and Rel-16 NR sidelink is expected to have limitation in achieving high reliability and low latency in some conditions, e.g., when the channel is relatively busy. Solutions that can enhance reliability and reduce latency are required in order to keep providing the use cases requiring low latency and high reliability under such communication conditions.

While several work areas have been identified in the discussion, some important principles were also discussed regarding the 3GPP evolution for NR sidelink. In dealing with different use cases in the evolution of NR sidelink, WGs should strive to achieve maximum commonality between commercial, V2X, and Critical Communication usage of sidelink in order to avoid duplicated solutions and maximize the economy of scale. In addition, enhancements introduced in Rel-17 should be based on the functionalities specified in Rel-16, instead of designing the fundamental NR sidelink functionality again in Rel-17.

4 Objective 4.1 Objective of SI or Core Part WI or Testing Part WI

The objective of this work item is to specify radio solutions that can enhance NR sidelink for the V2X, public safety and commercial use cases.

1. Sidelink evaluation methodology update: Define evaluation assumption and performance metric for power saving by reusing TR 36.843 and/or TR 38.840 (to be completed by RAN #89) [RAN1]

Note: TR 37.885 is reused for the other evaluation assumption and performance metric. Vehicle dropping model B and antenna option 2 shall be a more realistic baseline for highway and urban grid scenarios.

2. Resource allocation enhancement:

Specify resource allocation to reduce power consumption of the UEs [RAN1, RAN2]

Baseline is to introduce the principle of Rel-14 LTE sidelink random resource selection and partial sensing to Rel-16 NR sidelink resource allocation mode 2.

Note: Taking Rel-14 as the baseline does not preclude introducing a new solution to reduce power consumption for the cases where the baseline cannot work properly.

This work should consider the impact of sidelink DRX, if any.

Study the feasibility and benefit of solution(s) on the enhancement(s) in mode 2 for enhanced reliability and reduced latency in consideration of both PRR and PIR defined in TR37.885 (by RAN #91), and specify the identified solution(s) if deemed feasible and beneficial [RAN1, RAN2]

Inter-UE coordination with the following.

A set of resources is determined at UE-A. This set is sent to UE-B in mode 2, and UE-B takes this into account in the resource selection for its own transmission.

Note: The solution should be able to operate in-coverage, partial coverage, and out-of-coverage and to address consecutive packet loss in all coverage scenarios.

Note: RAN2 work will start after RAN #89.

3. Sidelink DRX for broadcast, groupcast, and unicast [RAN2]

Define on- and off-durations in sidelink and specify the corresponding UE procedure Specify mechanism aiming to align sidelink DRX wake-up time among the UEs communicating with each other Specify mechanism aiming to align sidelink DRX wake-up time with Uu DRX wake-up time in an in-coverage UE In the RAN2 #112-e meeting (as captured in 3GPP R2-2100001), RAN2 has the following agreements about NR V2X:

Agreements on SL DRX:
1: Sidelink DRX needs to support sidelink communications for both in and out of network's coverage scenarios.
2: RAN2 will prioritize normal use case without consideration of relay UE use case in Rel-17.
3: Support SL DRX for all casting types.
4: If a UE is in SL active time, UE should monitor PSCCH. FFS on PSSCH. FFS for sensing impacts.
5: RAN2 is not going to introduce SL paging and SL PO for SL DRX.
6: As baseline, for Sidelink DRX for SL unicast, it is proposed to inherit and use timers similar to what are used in Uu DRX. FFS for SL broadcast/groupcast. FFS on detailed timers.
7: Working assumption: SL DRX should take PSCCH monitoring also for sensing (in addition to data reception) into account if SL DRX is used.
8: Support of long DRX cycle for SL unicast should be assumed as a baseline. FFS on the need of short DRX cycle.
9: Deprioritize SL WUS from RAN2 point of view in Rel-17.

In the RAN1 #104-e meeting (as captured in 3GPP R1-2102281), RAN1 has the following agreements about NR Vehicle-to-Everything (V2X):

Agreements: In a resource pool (pre-)configured with at least partial sensing, if UE performs periodic-based partial sensing, at least when the reservation for another TB (when carried in SCI) is enabled for the resource pool and resource selection/reselection is triggered at slot n, it is up to UE implementation to determine a set of Y candidate slots within a resource selection window, where FFS condition(s) and timing(s) for which periodic-based partial sensing is performed by UE The resource selection window is [n+T1, n+T2]

As a baseline, T1 and T2 are defined in the same way as in R16 NR-V2X according to step 1 [TS 38.214 Sec. 8.1.4]

Further discuss whether or not to introduce a threshold to re-define T1 and T2 such that T1≥0 (subject to processing time constraint $T_{proc,1}$), and T2 remaining PDB T2-T1 (pre-)configured threshold A minimum value for Y is (pre-)configured from a range of values, FFS details FFS any restriction to determine Y candidate slots (including its relationship with SL-DRX)

FFS whether the resource selection window [n+T1, n+T2] should be confined within a set of periodic set of resources and its relationship with SL-DRX Note: The terminology "periodic-based partial sensing" is based on the "partial sensing" used in LTE-V and it is intended to be used for the design and discussion of partial sensing in Rel-17.

Agreements: In a resource pool (pre-)configured with at least partial sensing, if UE performs periodic-based partial sensing, at least when the reservation for another TB (when carried in SCI) is enabled for the resource pool and resource selection/reselection is triggered at slot n, the UE monitors slots of at least one ~~a set of~~ periodic sensing occasions, where a periodic sensing occasion is a set of slots according to $$t_{y-k \times P_{reserve}}^{SL}$$

if $t_v^{SL}$ is included in the set of Y candidate slots.

$P_{reserve}$ is a periodicity value from the configured set of possible resource reservation periods allowed in the resource pool (sl-ResourceReservePeriodList). Down select to one:

Option 1: $P_{reserve}$ corresponds to all values from the configured set sl-ResourceReservePeriodList Option 2: $P_{reserve}$ corresponds to a subset of values from the configured set sl-ResourceReservePeriodList FFS how to determine the subset (e.g., by (pre-)configuration, UE determination)

Option 3: $P_{reserve}$ is a common divisor among values in the configured set sl-ResourceReservePeriodList Option 4: FFS others k ~~equal to~~ is selected according to (down select to one)

Option 1: Only the most recent sensing occasion ~~within sensing~~ window for a given reservation periodicity before the resource (re)selection trigger or the set of Y candidate slots subject to processing time restriction Option 2: The two most recent sensing occasions ~~within sensing~~ window for a given reservation periodicity before the resource (re)selection trigger or the set of Y candidate slots subject to processing time restriction Option 3: All possible sensing occasions after $n-T_0$ Option 4: Only one periodic sensing occasion for one reservation period. The k value is up to UE implementation. Max value for k is (pre-)configured.

Option 5: k is (pre-)configured, including multiple values

Option 6: (pre-)configuration of a bitmap, same as in LTE-V

Option 7: FFS others

FFS relationship between periodic sensing occasions and SL-DRX

FFS condition(s) and timing(s) for which periodic-based partial sensing is performed by UE Note: companies are encouraged to show performance data for the down selections Agreements:
In a resource pool (pre-)configured with at least partial sensing, if UE performs contiguous partial sensing and resource (re-)selection is triggered in slot n, support the following option:

Option 1: For the purpose of resource (re-)selection, the UE monitors slots between $[n+T_A, n+T_B]$ and performs identification of candidate resources, in or after slot $n+T_B$, based on all available sensing results, including periodic-based partial sensing results (if applicable).

FFS $T_A$, $T_B$ (including the possibility of equal to zero, positive or negative) and remaining details (in particular, whether there should be exclusion of slots, changes in $T_A/T_B$ values for different purposes, etc.)

FFS whether n can be replaced by e.g., index of some of Y candidate slots

FFS condition(s) in which contiguous partial sensing is performed by UE

FFS interaction with SL-DRX, if any

FFS interaction with periodic-based partial sensing, if any

Other options are not precluded

In the RAN1 #105-e meeting (as captured in the RAN1 Chair's Notes of 3GPP TSG RAN WG1 #105-e), RAN1 has the following agreements about NR V2X:

Agreement:
For the set of $P_{reserve}$ values in periodic-based partial sensing, If no (pre-)configuration (i.e., by default), $P_{reserve}$ corresponds to all values from the (pre-)configured set sl-ResourceReservePeriodList.

Otherwise, a single set of $P_{reserve}$ values can be (pre-)configured, where the set of $P_{reserve}$ values are restricted to a subset of the (pre-)configured set sl-ResourceReservePeriodList This is per mode 2 Tx resource pool (pre-)configuration A UE by implementation may also monitor other sl-ResourceReservePeriodList values not part of the restricted subset In particular, the UE may additionally monitor occasions corresponding to P_RSVP_Tx FFS whether the monitoring can be mandatory Agreement:
In periodic-based partial sensing for resource (re)selection, the UE at least monitors in periodic sensing occasion(s) for a given reservation periodicity before the first slot of the selected Y candidate slots subject to processing time restriction for the identification of candidate resources.

The processing time restriction includes Tproc,0SL and Tproc,1SL.

Aspects relating to sensing during SL DRX are to be discussed separately

Relationship to re-evaluation and pre-emption operation for periodic-based partial sensing to be discussed separately FFS details including whether monitoring of periodic sensing occasions between triggering slot n and the first slot of the selected Y candidate slots subject to processing time restriction is performed as part of resource (re)selection or re-evaluation and pre-emption checking Agreement:
For the k value in periodic-based partial sensing for resource (re)selection, By default, the UE monitors the most recent sensing occasion for a given reservation periodicity before the resource (re)selection trigger slot n or the first slot of the set of Y candidate slots subject to processing time restriction.

If (pre-)configured, UE additionally monitors periodic sensing occasions that correspond to a set of values which can be (pre-)configured with at least one value (Working assumption) Possible values correspond to the most recent sensing occasion for a given reservation periodicity before the resource (re) selection trigger slot n or the first slot of the set of Y candidate slots, and the last periodic sensing occasion prior to the most recent one for the given reservation periodicity are included.

FFS: whether/which other values and details of the (pre-)configuration (e.g. max number of values or sensing occasions)

FFS: whether a value denotes a specific occasion to monitor or the earliest occasion to start the monitoring.

FFS relationship between periodic-based partial sensing occasions and SL-DRX

Note:
This is for the case when the resource (re)selection triggering slot n is expected by UE Agreement: In contiguous partial sensing for resource (re)selection, $T_A$ and $T_B$ values can be zero, positive or negative $T_A$ and $T_B$ values or range depend on different operating scenarios or conditions (e.g., periodic/aperiodic traffic, predictability of triggering slot n, remaining PDB, re-evaluation/pre-emption checking, HARQ feedback, CBR/CR parameter, power saving, etc)

FFS details

FFS: details of how periodic-based partial sensing and contiguous partial sensing are used for re-evaluation and pre-emption checking. Including how to reduce UE's power consumption (caused by additional sensing operation of re-evaluation/pre-emption) after its resource selection, with the considerations of different operating scenarios or conditions (e.g., pre-emption enabled/disabled, HARQ-ACK enabled/disabled, etc).

3GPP TS 38.331 specifies configuration for a sidelink resource pool in NR as follows:

SL-ResourcePool

The IE SL-ResourcePool specifies the configuration information for NR sidelink communication resource pool.

| SL-ResourcePool information element |
|---|

```
-- ASN1START
-- TAG-SL-RESOURCEPOOL-START

SL-ResourcePool-r16 ::=                    SEQUENCE {
    sl-PSCCH-Config-r16                        SetupRelease { SL-PSCCH-Config-r16 }
OPTIONAL,   -- Need M
    sl-PSSCH-Config-r16                        SetupRelease { SL-PSSCH-Config-r16 }
OPTIONAL,   -- Need M
    sl-PSFCH-Config-r16                        SetupRelease { SL-PSFCH-Config-r16 }
OPTIONAL,   -- Need M
    sl-SyncAllowed-r16                         SL-SyncAllowed-r16
OPTIONAL,   -- Need M
    sl-SubchannelSize-r16                      ENUMERATED { n10, n12, n15, n20, n25, n50, n75, n100 }
OPTIONAL,   -- Need M
    dummy                                      INTEGER (10..160)
OPTIONAL,   -- Need M
    sl-StartRB-Subchannel-r16                  INTEGER (0..265)
OPTIONAL,   -- Need M
    sl-NumSubchannel-r16                       INTEGER (1..27)
OPTIONAL,   -- Need M
    sl-Additional-MCS-Table-r16                ENUMERATED {qam256, qam64LowSE, qam256-qam64LowSE }
OPTIONAL,   -- Need M
    sl-ThreshS-RSSI-CBR-r16                    INTEGER (0..45)
OPTIONAL,   -- Need M
    sl-TimeWindowSizeCBR-r16                   ENUMERATED {ms100, slot100}
OPTIONAL,   -- Need M
    sl-TimeWindowSizeCR-r16                    ENUMERATED {ms1000, slot1000}
OPTIONAL,   -- Need M
    sl-PTRS-Config-r16                         SL-PTRS-Config-r16
OPTIONAL,   -- Need M
    sl-UE-SelectedConfigRP-r16                 SL-UE-SelectedConfigRP-r16
OPTIONAL,   -- Need M
    sl-RxParametersNcell-r16                   SEQUENCE {
        sl-TDD-Configuration-r16                   TDD-UL-DL-ConfigCommon
OPTIONAL,   -- Need M
        sl-SyncConfigindex-r16                     INTEGER (0..15)
    }
OPTIONAL,   -- Need M
    sl-ZoneConfigMCR-List-r16                  SEQUENCE (SIZE (16)) OF SL-ZoneConfigMCR-r16
OPTIONAL,   -- Need M
    sl-FilterCoefficient-r16                   FilterCoefficient
OPTIONAL,   -- Need M
    sl-RB-Number-r16                           INTEGER (10..275)
OPTIONAL,   -- Need M
    sl-PreemptionEnable-r16                    ENUMERATED {enabled, p11, p12, p13, p14, p15, p16 , p17,
p18}        OPTIONAL,   -- Need R
    sl-PriorityThreshold-UL-URLLC-r16          INTEGER (1..9)
OPTIONAL,   -- Need M
    sl-PriorityThreshold-r16                   INTEGER (1..9)
```

```
        OPTIONAL, -- Need M
    sl-X-Overhead-r16                    ENUMERATED {n0, n3, n6, n9}
        OPTIONAL, -- Need S
    sl-PowerControl-r16                  SL-PowerControl-r16
        OPTIONAL, -- Need M
    sl-TxPercentageList-r16              SL-TxPercentageList-r16
        OPTIONAL, -- Need M
    sl-MinMaxMCS-List-r16                SL-MinMaxMCS-List-r16
        OPTIONAL, -- Need M
    ...,
    [[
    sl-TimeResource-r16                  BIT STRING (SIZE (10..160))
        OPTIONAL, -- Need M
    ]]
}
[...]
SL-PSFCH-Config-r16 ::=                  SEQUENCE {
    sl-PSFCH-Period-r16                  ENUMERATED {s10, s11, s12, s14}
        OPTIONAL, -- Need M
    sl-PSFCH-RB-Set-r16                  BIT STRING (SIZE (10..275))
        OPTIONAL, -- Need M
    sl-NumMuxCS-Pair-r16                 ENUMERATED {n1, n2, n3, n6}
        OPTIONAL, -- Need M
    sl-MinTimeGapPSFCH-r16               ENUMERATED {s12, s13}
        OPTIONAL, -- Need M
    sl-PSFCH-HopID-r16                   INTEGER (0..1023)
        OPTIONAL, -- Need M
    sl-PSFCH-CandidateResourceType-r16   ENUMERATED {startSubCH, allocSubCH}
        OPTIONAL, -- Need M
    ...
}
SL-PTRS-Config-r16 ::=                   SEQUENCE {
    sl-PTRS-FreqDensity-r16              SEQUENCE (SIZE (2)) OF INTEGER (1..276)
        OPTIONAL, -- Need M
    sl-PTRS-TimeDensity-r16              SEQUENCE (SIZE (3)) OF INTEGER (0..29)
        OPTIONAL, -- Need M
    sl-PTRS-RE-Offset-r16                ENUMERATED {offset01, offset10, offset11}
        OPTIONAL, -- Need M
    ...
}
SL-UE-SelectedConfigRP-r16 ::=           SEQUENCE {
    sl-CBR-PriorityTxConfigList-r16      SL-CBR-PriorityTxConfigList-r16
        OPTIONAL, -- Need M
    sl-Thres-RSRP-List-r16               SL-Thres-RSRP-List-r16
        OPTIONAL, -- Need M
    sl-MultiReserveResource-r16          ENUMERATED {enabled}
        OPTIONAL, -- Need M
    sl-MaxNumPerReserve-r16              ENUMERATED {n2, n3}
        OPTIONAL, -- Need M
    sl-SensingWindow-r16                 ENUMERATED {ms100, ms1100}
        OPTIONAL, -- Need M
    sl-SelectionWindowList-r16           SL-SelectionWindowList-r16
        OPTIONAL, -- Need M
    sl-ResourceReservePeriodList-r16     SEQUENCE (SIZE (1..16)) OF SL-ResourceReservePeriod-
r16     OPTIONAL, -- Need M
    sl-RS-ForSensing-r16                 ENUMERATED {pscch, pssch},
    ...
}
SL-ResourceReservePeriod-r16 ::=         CHOICE {
    sl-ResourceReservePeriod1-r16        ENUMERATED {ms0, ms100, ms200, ms300, ms400, ms500,
ms600, ms700, ms800, ms900, ms1000},
    sl-ResourceReservePeriod2-r16        INTEGER (1..99)
}
SL-SelectionWindowList-r16 ::=           SEQUENCE (SIZE (8)) OF SL-SelectionWindowConfig-r16
SL-SelectionWindowConfig-r16 :: =        SEQUENCE {
    sl-Priority-r16                      INTEGER (1..8),
    sl-SelectionWindow-r16               ENUMERATED {n1, n5, n10, n20}
}
[....]
SL-PowerControl-r16 ::=     SEQUENCE {
    sl-MaxTransPower-r16        INTEGER (-30..33),
    sl-Alpha-PSSCH-PSCCH-r16    ENUMERATED {alpha0, alpha04, alpha05, alpha06, alpha07, alpha08,
alpha09, alpha1}  OPTIONAL,   -- Need M
    dl-Alpha-PSSCH-PSCCH-r16    ENUMERATED {alpha0, alpha04, alpha05, alpha06, alpha07, alpha08,
alpha09, alpha1}  OPTIONAL,   -- Need S
    sl-P0-PSSCH-PSCCH-r16       INTEGER (-16..15)
        OPTIONAL, -- Need S
    dl-P0-PSSCH-PSCCH-r16       INTEGER (-16..15)
```

```
OPTIONAL,    -- Need M
    d1-Alpha-PSFCH-r16              ENUMERATED {alpha0, alpha04, alpha05, alpha06, alpha07, alpha08,
alpha09, alpha1}   OPTIONAL,        -- Need S
    d1-P0-PSFCH-r16                 INTEGER (-16..15)
OPTIONAL,    -- Need M
    ...
}
-- TAG-SL-RESOURCEPOOL-STOP
-- ASN1STOP
```

SL-ResourcePool field descriptions

[...]
sl-NumSubchannel
Indicates the number of subchannels in the corresponding resource pool, which consists of contiguous
PRBs only.
sl-PreemptionEnable
Indicates whether pre-emption is disabled or enabled in a resource pool. If the field is present and the
value is p11, p12, and so on (but not enabled), it means that pre-emption is enabled and a priority
level p_preemption is configured. If the field is present and the value is enabled, the pre-emption is
enabled (but p_preemption is not configured) and pre-emption is applicable to all levels.
sl-PriorityThreshold-UL-URLLC
Indicates the threshold used to determine whether NR sidelink transmission is prioritized over uplink
transmission of priority index 1 as specified in TS 38.213[13], clause 16.2.4.3, or whether PUCCH
transmission carrying SL HARQ is prioritized over PUCCH transmission carrying UCI of priority index 1 if
they overlap in time as specified in TS 38.213 [13], clause 9.2.5.0.
sl-PriorityThreshold
Indicates the threshold used to determine whether NR sidelink transmission is prioritized over uplink
transmission of priority index 0 as specified in TS 38.213[13], clause 16.2.4.3, or whether PUCCH
transmission carrying SL HARQ is prioritized over PUCCH transmission carrying UCI of priority index 0 if
they overlap in time as specified in TS 38.213 [13], clause 9.2.5.0.
sl-RB-Number
Indicates the number of PRBs in the corresponding resource pool, which consists of contiguous PRBs
only. The remaining RB cannot be used (See TS 38.214[19], clause 8).
sl-StartRB-Subchannel
Indicates the lowest RB index of the subchannel with the lowest index in the resource pool with
respect to the lowest RB index of a SL BWP.
sl-SubchannelSize
Indicates the minimum granularity in frequency domain for the sensing for PSSCH resource selection
in the unit of PRB.
[...]
[...]

SL-PSFCH-Config field descriptions sl-MinTimeGapPSFCH
The minimum time gap between PSFCH and the associated PSSCH in the unit of slots.
sl-NumMuxCS-Pair
Indicates the number of cyclic shift pairs used for a PSFCH transmission that can be multiplexed in a
PRB.
sl-PSFCH-CandidateResourceType
Indicates the number of PSFCH resources available for multiplexing HARQ-ACK information in a PSFCH
transmission (see TS 38.213 [13], clause 16.3).
sl-PSFCH-HopID
Scrambling ID for sequence hopping of the PSFCH used in the resource pool.
sl-PSFCH-Period
Indicates the period of PSFCH resource in the unit of slots within this resource pool. If set to sl0, no
resource for PSFCH, and HARQ feedback for all transmissions in the resource pool is disabled.
sl-PSFCH-RB-Set
Indicates the set of PRBs that are actually used for PSFCH transmission and reception. The leftmost bit
of the bitmap refers to the lowest RB index in the resource pool, and so on
[...]

SL-UE-SelectedConfigRP field descriptions sl-MaxNumPerReserve
Indicates the maximum number of reserved PSCCH/PSSCH resources that can be indicated by an SCI.
sl-MultiReserveResource
Indicates if it is allowed to reserve a sidelink resource for an initial transmission of a TB by an SCI
associated with a different TB, based on sensing and resource selection procedure.
sl-ResourceReservePeriodList
Set of possible resource reservation period allowed in the resource pool in the unit of ms. Up to 16
values can be configured per resource pool.
sl-RS-ForSensing
Indicates whether DMRS of PSCCH or PSSCH is used for L1 RSRP measurement in the sensing
operation.
sl-SensingWindow
Parameter that indicates the start of the sensing window.
sl-SelectionWindowList
Parameter that determines the end of the selection window in the resource selection for a TB with
respect to priority indicated in SCI. Value n1 corresponds to $1*2^\mu$, value n5 corresponds to $5*2^\mu$, and -continued so on, where µ = 0, 1, 2, 3 refers to SCS 15, 30, 60, 120 kHz respectively.
sl-Thres-RSRP-List
Indicates a list of 64 thresholds, and the threshold should be selected based on the priority in the
decoded SCI and the priority in the SCI to be transmitted. A resource is excluded if it is indicated or
reserved by a decoded SCI and PSSCH/PSCCH RSRP in the associated data resource is above a
threshold.

SL-PowerControl field descriptions sl-MaxTransPower
Indicates the maximum value of the UE's sidelink transmission power on this resource pool. The unit is
dBm.
sl-Alpha-PSSCH-PSCCH
Indicates alpha value for sidelink pathloss based power control for PSCCH/PSSCH when sl-P0-PSSCH is
configured. When the field is absent the UE applies the value 1.
sl-P0-PSSCH-PSCCH
Indicates P0 value for sidelink pathloss based power control for PSCCH/PSSCH. If not configured,
sidelink pathloss based power control is disabled for PSCCH/PSSCH.
dl-Alpha-PSSCH-PSCCH
Indicates alpha value for downlink pathloss based power control for PSCCH/PSSCH when dl-P0-PSSCH
is configured. When the field is absent the UE applies the value 1.
dl-P0-PSSCH-PSCCH
Indicates P0 value for downlink pathloss based power control for PSCCH/PSSCH. If not configured,
downlink pathloss based power control is disabled for PSCCH/PSSCH.
dl-Alpha-PSFCH
Indicates alpha value for downlink pathloss based power control for PSFCH when dl-P0-PSFCH is
configured. When the field is absent the UE applies the value 1.
dl-P0-PSFCH
Indicates P0 value for downlink pathloss based power control for PSFCH. If not configured, downlink
pathloss based power control is disabled for PSFCH.

One or multiple of following terminologies may be used hereafter:
  BS: A network central unit or a network node in NR which is used to control one or multiple TRPs which are associated with one or multiple cells. Communication between BS and TRP(s) is via fronthaul. BS could also be referred to as central unit (CU), eNB, gNB, or NodeB.
  TRP: A transmission and reception point provides network coverage and directly communicates with UEs. TRP could also be referred to as distributed unit (DU) or network node.
  Cell: A cell is composed of one or multiple associated TRPs, i.e. coverage of the cell is composed of coverage of all associated TRP(s). One cell is controlled by one BS. Cell could also be referred to as TRP group (TRPG).
  Slot: A scheduling unit in NR. Slot duration is 14 OFDM symbols.
  Mini-slot: A scheduling unit with duration less than 14 OFDM symbols.
  For UE side:
  There are at least two UE (RRC) states: connected state (or active state) and non-connected state (or inactive state or idle state). Inactive state may be an additional state or belong to connected state or non-connected state.
  In LTE/LTE-A sidelink (as discussed in 3GPP TS 36.213), sensing-based resource selection procedure is supported in sidelink transmission mode 4. As an instance shown in FIG. 10, when sensing-based resource selection is triggered/requested in subframe n, the UE will have a candidate resource set comprising multiple candidate resources. The available candidate resource set is restricted with time interval $[n+T_1, n+T_2]$, which may be called as resource selection window.
  If full sensing is performed, e.g. partially sensing is not configured, the available candidate resource set are in the (full) time interval $[n+T_1, n+T_2]$. In one embodiment, a candidate resource may mean one candidate single-subframe resource. One candidate resource may comprise one or multiple resource units. The resource unit may be a sub-channel. In one embodiment, the resource unit may comprise multiple (physical) resource blocks in a Transmission Time Interval (TTI). The TTI may be a subframe in LTE.
  Based on sensing result within a sensing duration, the UE may generate a valid/identified resource set, wherein the valid/identified resource set is a subset of the candidate resource set. The generation of the valid/identified resource set may be performed via excluding some candidate resources from the candidate resource set, for instance the step 2-1 and step 2-2 shown in FIG. 10. The generation of the valid/identified resource set may be performed via selecting some valid/identified candidate resources, for instance the step 3-1 shown in FIG. 1. And then, the UE could select one or some valid/identified resources from the valid/identified resource set to perform sidelink transmission from the UE. The resource selection for sidelink transmission may be randomly selected from the valid/identified resource set, for instance the step 3-2 shown in FIG. 10.
  As discussed in 3GPP TS 36.213, the first excluding step is that if the UE does not monitor/sense a TTI z, the UE may not expect whether the candidate resources in TTI "$z+P_{any}$" are occupied or not, wherein $P_{any}$ means any possible periodicity for transmission. For instance, the first excluding step is shown as the step 2-1 in FIG. 10. For the case of $P_{any} \geq 100$ ms, the UE may exclude the candidate resources in TTI "$z+P_{any}$", and may exclude the candidates resources for which the UE may have possible transmission occurred in TTI "$z+P_{any}$". For the case of $P_{any} < 100$ ms, the UE may exclude the candidate resources in TTI "$z+q \cdot P_{any}$", and may exclude the candidates resources for which the UE may have possible transmission occurred in TTI "$z+q \cdot P_{any}$", wherein q is 1, 2, . . . , $100/P_{any}$. The parameter q may mean that the UE excludes multiple candidate resources with period $P_{any}$ within time interval $[z, z+100]$. The possible transmission may mean a transmission on a selected resource. The possible transmission may mean a periodic transmission of a transmission on a selected resource. Moreover, $P_{any}$ may mean any possible periodicity configured by higher layer.

The second excluding step is that if the UE receives/detects a control signaling in a TTI m, the UE may exclude the candidate resources according to the received control signaling. For instance, the second excluding step is shown as the step 2-2 in FIG. 10. More specifically, if the UE receives/detects a control signaling scheduling a transmission in a TTI m and the measurement result of the scheduled transmission and/or the control signal is over a threshold, the UE may exclude the candidate resources according to the received control signaling. The measurement result may be Reference Signal Received Power (RSRP). More specifically, the measurement result may be PSSCH-RSRP. The control signaling may indicate the resources of the scheduled transmission and/or periodicity of the scheduled transmission, $P_{RX}$. The excluded candidate resources according to the received control signaling may be the resources of next one scheduled transmission based on the resources of the scheduled transmission and periodicity of the scheduled transmission, such as for the case of $P_{RX}>=100$ ms. Moreover, the excluded candidate resources according to the received control signaling may be the resources of next multiple scheduled transmissions based on the resources of the scheduled transmission and periodicity of the scheduled transmission, such as for the case of $P_{RX}<100$ ms. The next multiple scheduled transmissions may be with period $P_{RX}$ within time interval [m, m+100]. If the control signaling indicates that there is no next scheduled transmission or the control signaling indicates that the resource of scheduled transmission is not kept in next time or the control signaling indicates that the scheduled transmission is the last transmission from the UE transmitting the control signaling or the control signaling indicates that the periodicity of the scheduled transmission is indicated as zero, the UE may not exclude candidate resources according to the received control signaling.

Figure 10:
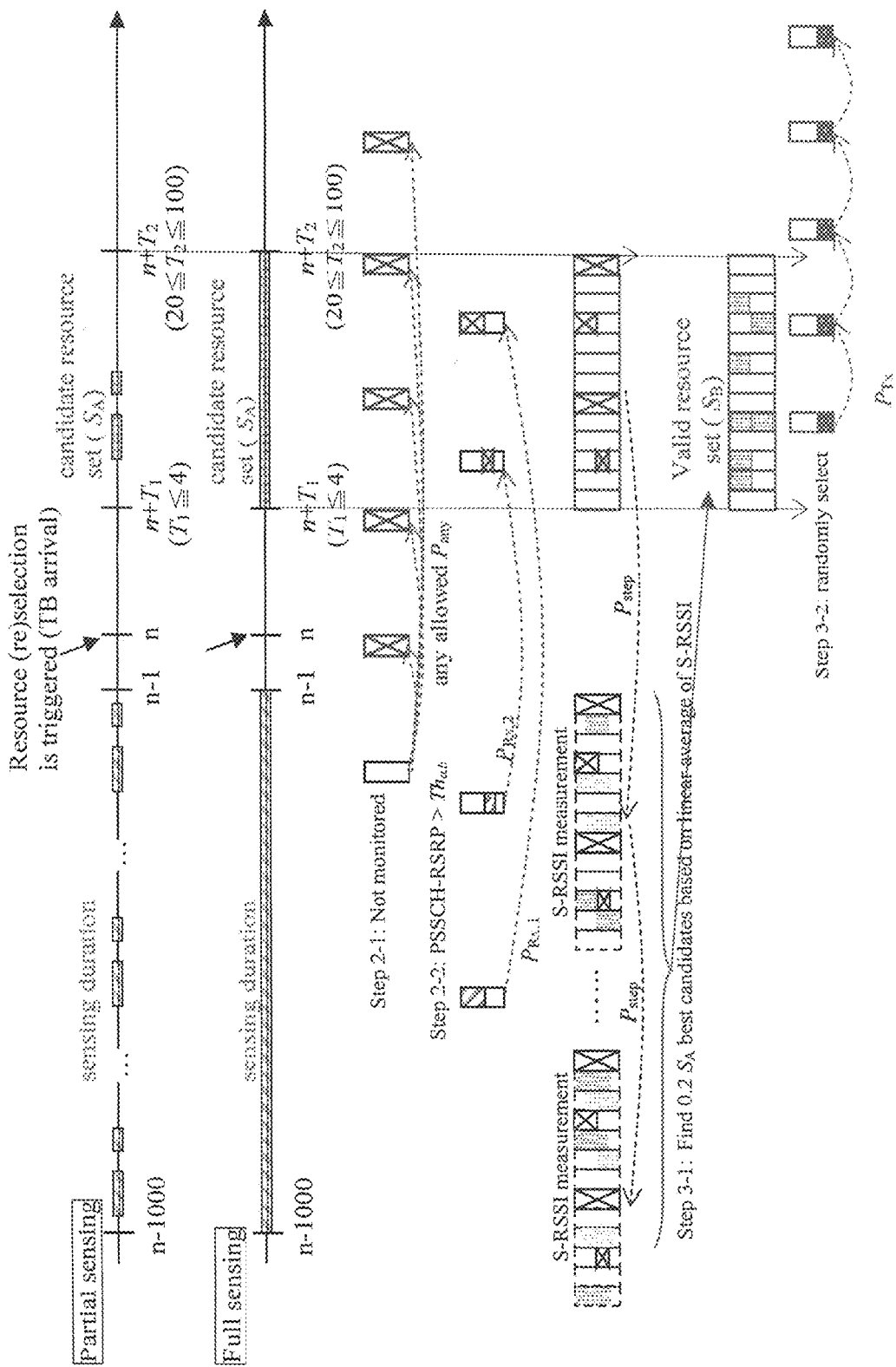
FIG. 10 is a diagram according to one exemplary embodiment.

After the first excluding step and the second excluding step, the UE may select some valid/identified candidate resources from the remaining candidate resources, such as the step 3-1 shown in FIG. 10. The UE may measure resources in the sensing duration, wherein the measured resources are associated with the remaining candidate resources after the step 2-1 and step 2-2. More specifically, for a remaining candidate resource, the associated measured resources in the sensing duration are in the occasions with multiple times of a time period from the remaining candidate resources. For instance, if the time period is 100 TTIs, the associated measured resources in the sensing duration may be in the TTI "n−j·100", j is positive integer, for a remaining candidate resource in TTI n. Moreover, the associated measured resources in the sensing duration may be with the same frequency resources as the remaining candidate resource. More specifically, the measurement may be Sidelink Received Signal Strength Indicator (S-RSSI) measurement. Based on the measurement, the UE can derive metric for each remaining candidate resource.

The metric for a remaining candidate resource may be linear average of S-RSSI measured from its associated measured resources in the sensing duration. And then, the UE may select valid/identified candidate resources based on the metric of each remaining candidate resource. In one embodiment, an action is that a remaining candidate resource with the smallest metric is selected as valid/identified candidate resource and moved into a valid/identified resource set. Repeating the action until the UE selects a number of remaining candidate resources as valid candidate resources and moves the number of remaining candidate resources into the valid/identified resource set. For instance, the number may be larger than or equal to 20% of total candidate resources. The number may be larger than or equal to 20% of cardinality of the candidate resource set.

Based on the current sensing procedure, the UE can determine the valid/identified resource set. The valid/identified resource set may be reported to higher layers for sidelink transmission from the UE. The UE may select one or some valid/identified resources from the valid/identified resource set to perform sidelink transmission from the UE. The sidelink transmission from the UE may be PSSCH transmission. In one embodiment, the sidelink transmission from the UE may be device-to-device transmission.

When partial sensing in LTE/LTE-A sidelink is configured, the UE could determine by its implementation a set of subframes which consists of at least Y subframes within the time interval [n+$T_1$, n+$T_2$], wherein the available candidate resource set are in the set of subframes. If a subframe $t_y$ is in the set of subframes, the UE shall monitor any subframe $t_{y-(k\times 100ms)}$, wherein k is one or more configured values. Generally, since the UE already performed sensing in some subframes before partial sensing-based resource selection is triggered/requested, it is reasonable that the UE determines the set of subframes based on the sensing result in the some subframes. It means that if the some subframes comprises subframes $t_{y-(k\times 100ms)}$ for all configured k value(s), the subframe $t_y$ can be determined to being in the set of subframes. If the some subframes does not comprise any subframes $t_{y-(k\times 100ms)}$ for all configured k value(s), the subframe $t_y$ may not be determined to being in the set of subframes. Thus, for partial sensing in LTE/LTE-A, there may be no need to perform the first excluding step as shown as the step 2-1 in FIG. 10, which is to deal with the case that the UE has not monitor a subframe before (partial) sensing-based resource selection is triggered/requested.

For NR Rel-16 sidelink transmission, there are two sidelink resource allocation modes defined for NR-V2X sidelink communication (as discussed in 3GPP TS 38.214):

mode 1 is that base station/network node can schedule sidelink resource(s) to be used by UE for sidelink transmission(s), which concept is similar as sidelink transmission mode 3 in LTE/LTE-A (as discussed in 3GPP TS 36.213); and mode 2 is that UE determines (i.e. base station/network node does not schedule) sidelink transmission resource(s) within sidelink resources configured by base station/network node or pre-configured sidelink resources, which concept is similar as sidelink transmission mode 4 in LTE/LTE-A (as discussed in 3GPP TS 36.213).

For network scheduling mode, e.g. NR sidelink resource allocation mode 1, the network node may transmit a sidelink (SL) grant on Uu interface for scheduling resources of PSCCH and/or PSSCH. The V2X UE may perform PSCCH and PSSCH transmissions on PC5 interface, in response to the receive sidelink grant. The Uu interface may mean the wireless interface for communication between network and UE. The PC5 interface may mean the wireless interface for communication (directly) between UEs/devices.

For UE (autonomous) selection mode, e.g. NR sidelink resource allocation mode 2, since transmission resource is not scheduled via network, the UE may require performing sensing before selecting a resource for transmission (e.g., sensing-based transmission), in order to avoid resource collision and interference from or to other UEs. Currently, full sensing is supported in NR Rel-16 sidelink. Partial sensing may not be supported/designed for NR Rel-16 sidelink. Moreover, the step 3-1 shown in FIG. 10 may not applied for sensing procedure in NR sidelink (as discussed in 3GPP TS 38.214). Based on the result of sensing procedure, the UE can determine a valid/identified resource set. The valid/identified resource set may be reported to higher layers (of the UE). The UE may (randomly) select one or multiple valid/identified resources from the valid/identified resource set to perform sidelink transmission(s) from the UE. The sidelink transmission(s) from the UE may be PSCCH and/or PSSCH transmission.

Moreover, for NR sidelink transmission, resource reservation for another TB by a SCI could be (pre-)configured with enabled or not enabled or not configured in a sidelink resource pool. When a sidelink resource pool is configured with enabled such reservation, the sidelink resource pool could be configured with a set of (reservation) period values. Possible (reservation) period could be 0, [1:99], 100, 200, 300, 400, 500, 600, 700, 800, 900, or 1000 ms. Resource reservation period field in a SCI in the sidelink resource pool could indicate which period value for (future) resource reservation. The size/number of the set of period values could be from 1 to 16.

In the Justification and objective of work item for NR Rel-17 V2X (as captured in 3GPP RP-202846), power saving is one of enhancement to enable UEs with battery constraint to perform sidelink operations in a power efficient manner. To reduce power consumption, it may specify/design partial sensing to Rel-17 NR sidelink resource allocation mode 2. Thus, a UE may perform partial sensing to select sidelink resources, instead of performing full sensing with more power consumption. Note that the partial sensing and resource selection is performed from transmitter aspect of the UE.

Periodic-Based Partial Sensing

Based on RAN1 #104-e and #105-e meeting (as captured in 3GPP R1-2102281 and in the RAN1 Chair's Notes of 3GPP TSG RAN WG1 #105-3, periodic-based partial sensing can be supported for/in a sidelink resource pool. As an instance shown in FIG. 11, when the UE triggers/requests sensing-based resource selection, e.g. in slot n, for a sidelink data, candidate resources may be in candidate slots within associated resource selection window. Note that the associated resource selection window, e.g. in time interval $[n+T_1, n+T_2]$, may be upper bounded based on remaining packet delay budget (PDB). It is up to UE implementation to determine a set of Y candidate slots within a resource selection window, e.g. the candidate slots $t_{y0}$, $t_{y1}$, and $t_{y2}$. According to agreements in RAN1 #104-e, if/when the candidate slot $t_{y0}$ is included in the set of Y candidate slots, the UE monitors slots of periodic sensing occasions associated with the candidate slot $t_{y0}$, e.g. the slots $t_{y0-P1}$, $t_{y0-P2}$, and $t_{y0-P3}$. If the UE monitors/detects/receives a SCI (e.g. S in slot $t_{y0-P3}$ in FIG. 11) indicating resource reservation in the candidate slot $t_{y0}$, the UE could exclude candidate resource(s) which is (at least partially) overlapped with the resource(s) reserved by the SCI S in the candidate slot $t_{y0}$. The SCI S may indicate a priority higher than the sidelink data of the UE. The SCI S may be received, by the UE, with a reference signal received power larger than a threshold. More specifically, the SCI S may schedule/indicate sidelink (re)transmission(s) from the other UE for delivering/transmitting one TB. The SCI S may also reserve one or more sidelink resource(s) for another TB different from the one TB, e.g. "Resource reservation period" field in the SCI S indicates not-zero period value.

In one embodiment, the SCI S may schedule/indicate the sidelink (re)transmission(s) for delivering/transmitting the one TB via "Frequency resource assignment" field and "Time resource assignment" field. Preferably, the SCI S may reserve the one or more sidelink resource(s) for the another TB via "Resource reservation period" field (e.g. indicating period P3) and/or "Frequency resource assignment" field and "Time resource assignment" field.

Figure 11:
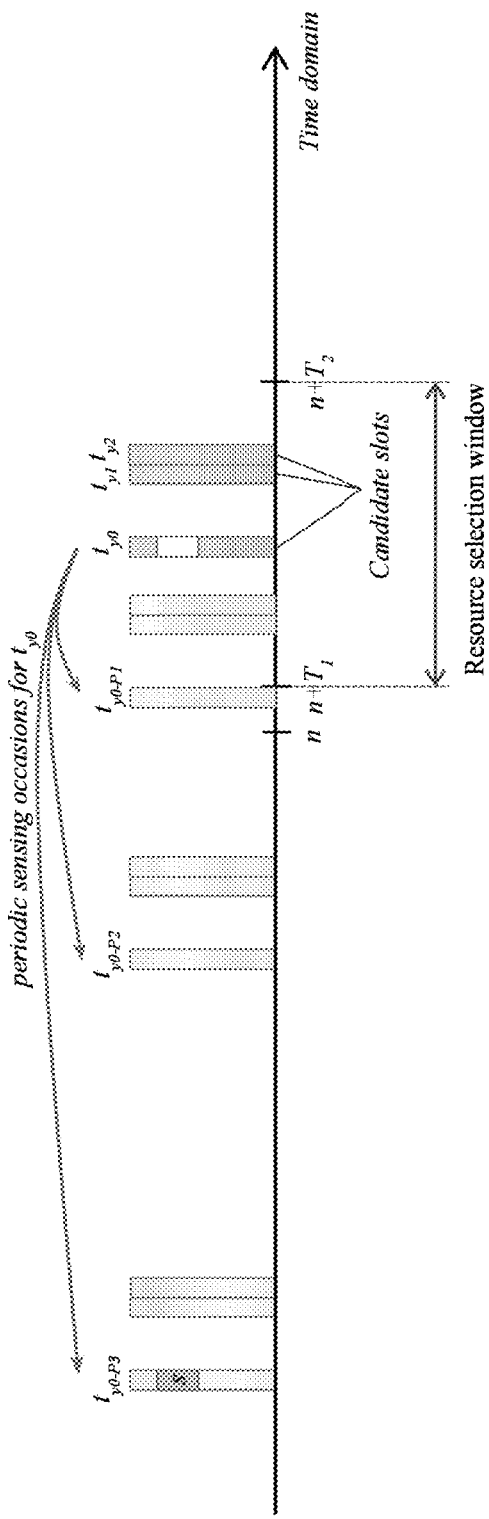
FIG. 11 is a diagram according to one exemplary embodiment.

According to agreements in RAN1 #105-e, the periodic sensing occasions are determined/derived based on all period values (pre-)configured for the sidelink resource pool, or based on a configured set of period values for periodic-based partial sensing. Thus, FIG. 11 shows an instance that the sidelink resource pool (pre-)configures period values P1, P2, P3 for periodic resource reservation. Alternatively, FIG. 11 shows another instance that the sidelink resource pool configures period values P1, P2, P3 for periodic-based partial sensing, wherein the sidelink resource pool (pre-)configures at least the period values P1, P2, P3 for periodic resource reservation.

Moreover, for NR Rel-17 sidelink, it is possible that the first available candidate slot $t_{y0}$ is later than the first slot within the time interval $[n+T_1, n+T_2]$. The reason may comprise any of SL DRX (TX UE may select resources based on RX UE's sidelink active time), support of contagious partial sensing ($t_{y0}$ may be later than $n+T_B$), or UE (already) sensed slots before slot n (to satisfy the requirement of periodic sensing occasions). According to agreements in RAN1 #105-e, the UE can at least monitor periodic sensing occasion(s) for a given reservation periodicity before the first slot of the Y candidate slots (subject to processing time restriction for the identification of candidate resources). Thus, it seems not possible to guarantee all periodic sensing occasions being before the trigger/request of sensing-based resource selection, e.g. in slot n. The UE may just determine the set of Y candidate slots based on (part of) periodic sensing occasions before the trigger/request of sensing-based resource selection. Assuming there is a time gap between the slot n and the first available candidate slot $t_{y0}$, the UE may still need to perform sensing in periodic sensing occasions within the time gap. More specifically, if a periodic sensing occasion associated with a period (value) shorter/smaller than the value of time gap, the periodic sensing occasion may be within the time gap, e.g. the slot $t_{y0-P1}$ in FIG. 11.

However, if the UE does not perform sensing in the periodic sensing occasion within the time gap, e.g. the slot $t_{y0-P1}$ in FIG. 11, it may need some handling to ensure reliability of sensing-based resource selection. One possible reason may be because the UE may need to perform sidelink transmission or uplink transmission in the slot $t_{y0-P1}$.

Contiguous Partial Sensing

Based on RAN1 #104-e meeting (as captured in 3GPP R1-2102281), contiguous partial sensing can be supported for/in a sidelink resource pool (pre-)configured with at least partial sensing. As an instance shown in FIG. 12, when the UE triggers/requests sensing-based resource selection, e.g. in slot n, for a sidelink data, candidate resources may be in candidate slots within associated resource selection window. Note that the associated resource selection window, e.g. in time interval $[n+T_1, n+T_2]$, may be upper bounded based on remaining packet delay budget (PDB). It is up to UE implementation to determine a set of Y candidate slots within a resource selection window, e.g. the candidate slots $t_{y0}$, $t_{y1}$, and $t_{y2}$. According to agreements in RAN1 #104-e, for contiguous partial sensing, the UE monitors slots between $[n+T_A, n+T_B]$ and performs identification of candidate resources, in or after slot $n+T_B$. $T_A$ and $T_B$ values can be zero, positive or negative, wherein $T_A$ and $T_B$ values or ranges depend on different operating scenarios or conditions (as captured in the RAN1 Chair's Notes of 3GPP TSG RAN WG1 #105-e. It may mean that the first candidate slot $t_{y0}$ is in or after slot $n+T_B$.

Figure 12:
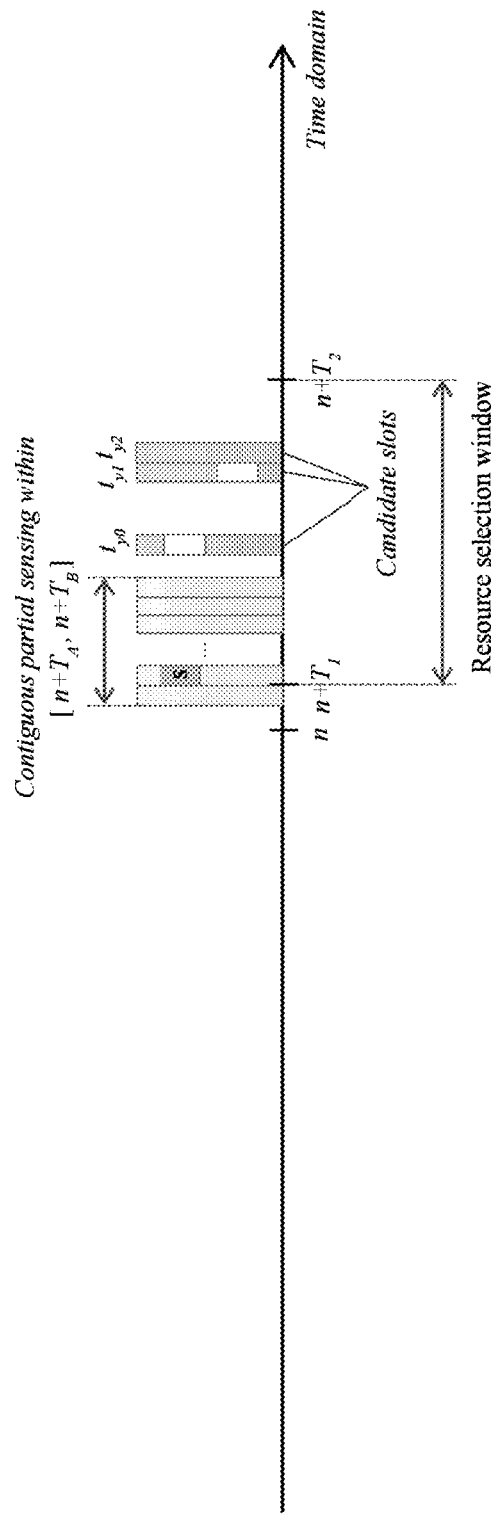
FIG. 12 is a diagram according to one exemplary embodiment.

If the UE monitors/detects/receives a SCI, e.g. S within $[n+T_A, n+T_B]$ in FIG. 12, indicating resource reservation in the candidate slot $t_{y0}$ and/or $t_{y1}$, the UE could exclude candidate resource(s) which is (at least partially) overlapped with the resource(s) reserved by the SCI S in the candidate slot $t_{y0}$ and/or $t_{y1}$. The SCI S may indicate a priority higher than the sidelink data of the UE. The SCI S may be received, by the UE, with a reference signal received power larger than a threshold. More specifically, the SCI S may schedule/indicate sidelink (re)transmission(s) from the other UE for delivering/transmitting one TB. The SCI S can schedule/indicate the sidelink (re)transmission(s) within 31 slots, since "Time resource assignment" field in the SCI S can indicate time gap value as at most 31 ($1 \le t_1 \le 31$; or $1 \le t_1 \le 30$, $t_1 < t_2 \le 31$ as discussed in 3GPP TS 38.214). The SCI S may also reserve one or more sidelink resource(s) for another TB different from the one TB, e.g. "Resource reservation period" field in the SCI S indicates not-zero period value.

In one embodiment, the SCI S may schedule/indicate the sidelink (re)transmission(s) for delivering/transmitting the one TB via "Frequency resource assignment" field and "Time resource assignment" field. The SCI S may reserve the one or more sidelink resource(s) for the another TB via "Resource reservation period" field and/or "Frequency resource assignment" field and "Time resource assignment" field.

However, if the UE does not perform sensing in a slot within $[n+T_A, n+T_B]$, it may need some handling to ensure reliability of sensing-based resource selection. One possible reason may be because the UE needs to perform sidelink transmission or uplink transmission in the slot within $[n+T_A, n+T_B]$.

Note that the time interval $[n+T_A, n+T_B]$ for contiguous partial sensing may be referred to some of the Y candidate slots, e.g. the first slot of the Y candidate slots. In one instance, the time interval $[n+T_A, n+T_B]$ may be replaced/represented/changed as $[t_{y0}-T'_A, t_{y0}-T'_B]$.

To deal with these issues for periodic-based partial sensing and/or contiguous partial sensing, some mechanisms/methods/embodiments are provided as follows:

Assuming that a UE may have a configuration for a sidelink resource pool (pre-) configured with at least partial sensing, resource reservation for another TB (when carried in SCI) may be enabled or disabled for the sidelink resource pool. The sidelink resource pool could be in/within a carrier/cell or a sidelink BWP.

The UE may trigger/request partial sensing-based resource (re-)selection in a first slot n. The partial sensing-based resource (re-)selection could be to determine one or more (valid/identified) sidelink resources for transmitting at least a first sidelink data.

More specifically, the UE may determine a set of candidate slots within a resource selection window. The resource selection window may mean a time interval $[n+T_1, n+T_2]$. The first candidate slot of the set of candidate slots may be denoted as $t_{y0}$. There may be a time gap between the first slot n and the first candidate slot $t_{y0}$. The sidelink resources in the set of candidate slots may be candidate sidelink resources for the partial sensing-based resource (re-) selection.

In one embodiment, for the set of candidate slots, associated periodic sensing occasions could be determined/derived based on all period values (pre-)configured for the sidelink resource pool. Additionally or alternatively, for the set of candidate slots, associated periodic sensing occasions could be determined/derived based on a configured set of period values for periodic-based partial sensing. In one embodiment, the UE may determine the set of candidate slots based on at least (part of) periodic sensing occasions before the first slot n. Additionally or alternatively, the UE may not determine the set of candidate slots based on periodic sensing occasions after the first slot n. For partial sensing-based resource (re-)selection, the UE may (need to) monitor (slots of) the periodic sensing occasions.

Moreover, if/when contiguous partial sensing is supported for/in the sidelink resource pool, the UE may (need to) monitor slots within a contiguous partial sensing window. In one embodiment, the contiguous partial sensing window may mean a time interval $[n+T_A, n+T_B]$. Additionally or alternatively, the time interval $[n+T_A, n+T_B]$ for contiguous partial sensing may be referred to some of the set of candidate slots, e.g. the first candidate slot of the set of candidate slots. In one instance, the time interval $[n+T_A, n+T_B]$ may be replaced/represented/changed as $[t_{y0}-T'_A, t_{y0}-T'_B]$.

The UE may derive/determine a set of (valid/identified) sidelink resources, from the candidate sidelink resources in the set of candidate slots, based on sensing result of periodic-based partial sensing and/or contiguous partial sensing. In one embodiment, the UE may derive/determine a set of (valid/identified) sidelink resources, from the candidate sidelink resources in the set of candidate slots, based on sensing result of (all) the associated periodic sensing occasions and/or the slots within the contiguous partial sensing window. In one embodiment, the UE may derive/determine the set of (valid/identified) sidelink resources, from the remaining candidate sidelink resources after exclusion in the method a or method b.

The set of (valid/identified) sidelink resources may be reported to higher layers of the UE. (The higher layers of) the UE may select the one or more (valid/identified) sidelink resources from the set of (valid/identified) sidelink resources. The UE may perform one or more sidelink transmission in the one or more (valid/identified) sidelink resources for transmitting the first sidelink data.

Method a

In general, the concept of method a is if the UE does not perform sensing in a second slot m after the first slot, the UE could exclude a first set of candidate sidelink resources from the candidate sidelink resources in the set of candidate slots.

In one embodiment, the second slot m may be after the first slot and before the first candidate slot of the set of candidate slots. The second slot m may be within the time gap between the first slot n and the first candidate slot.

In one embodiment, the second slot m may be one slot/occasion of associated periodic sensing occasions. The second slot m may be a sensing slot for periodic-based partial sensing. Additionally or alternatively, the second slot m may be within the contiguous partial sensing window. The second slot m may be a sensing slot for contiguous partial sensing.

In one embodiment, the first set of candidate sidelink resources could be in a first set of candidate slots. The first set of candidate slots may be a subset of the set of candidate slots. In one embodiment, the UE may derive/determine the first set of candidate slots as intersection of a set of exclusion slots and the set of candidate slots. The UE could exclude (all) candidate sidelink resources in the first set of candidate slots (in the sidelink resource pool).

In one embodiment, the UE could exclude a first candidate sidelink resource if the first candidate sidelink resource is in/within a set of exclusion slots. The first candidate sidelink resource may be one candidate sidelink resource in the first set of candidate sidelink resources. The first candidate sidelink resource may be in/within the first set of candidate slots.

In one embodiment, the UE could exclude any candidate sidelink resource(s) if the any candidate sidelink resource(s) is in/within the set of exclusion slots and in/within the set of candidate slots. The first set of candidate slots may be intersection of the set of exclusion slots and the set of candidate slots. The any candidate sidelink resource(s) may comprise at least the first candidate sidelink resource. The first set of candidate sidelink resource may comprise the any candidate sidelink resource(s).

In one embodiment, the UE could exclude one candidate slot from the set of candidate slots if the one candidate slot is in/within a set of exclusion slots. The one candidate slot is in/within the first set of candidate slots. The first set of candidate slots may be intersection of the set of exclusion slots and the set of candidate slots. The UE could exclude the first set of candidate slots from the set of candidate slots. The UE could exclude any candidate slot(s) if the any candidate slot(s) is in/within the set of exclusion slots. The first set of candidate sidelink resource may comprise (all) candidate sidelink resources in the any candidate slot(s).

Some possible embodiments about the first set of candidate slots and/or the set of exclusion slots are described below:

In one embodiment, the first set of candidate slots could be derived/determined based on the second slot and (all) period values (pre-)configured for the sidelink resource pool. For instance, if the sidelink resource pool (pre-)configures period values P1, P2, P3 for periodic resource reservation, the first set of candidate slots may be slots m+P1, m+P2, m+P3.

In one embodiment, the set of exclusion slots could be derived/determined based on the second slot and (all) period values (pre-)configured for the sidelink resource pool. For instance, if the sidelink resource pool (pre-)configures period values P1, P2, P3 for periodic resource reservation, the set of exclusion slots may be slots m+P1, m+P2, m+P3.

In one embodiment, the first set of candidate slots could be derived/determined based on the second slot and the configured set of period values for periodic-based partial sensing. For instance, if the sidelink resource pool (pre-)configures period values P1, P2, P3, P4, P5 for periodic resource reservation and if the sidelink resource pool configures period values P1, P2, P3 for periodic-based partial sensing, the first set of candidate slots may be slots m+P1, m+P2, m+P3.

In one embodiment, the set of exclusion slots could be derived/determined based on the second slot and the configured set of period values for periodic-based partial sensing. For instance, if the sidelink resource pool (pre-)configures period values P1, P2, P3, P4, P5 for periodic resource reservation and if the sidelink resource pool configures period values P1, P2, P3 for periodic-based partial sensing, the set of exclusion slots may be slots m+P1, m+P2, m+P3.

The UE may trigger/request the partial sensing-based resource (re-)selection for the one or more (valid/identified) sidelink resources with a first reservation period value.

In one embodiment, the first set of candidate slots could be derived/determined based on the second slot and the configured set of period values for periodic-based partial sensing and the first reservation period value. For instance, if the sidelink resource pool (pre-)configures period values P1, P2, P3, P4, P5 for periodic resource reservation and if the sidelink resource pool configures period values P1, P2, P3 for periodic-based partial sensing and if the first reservation period value is P4, the first set of candidate slots may be slots m+P1, m+P2, m+P3, m+P4.

In one embodiment, the set of exclusion slots could be derived/determined based on the second slot and the configured set of period values for periodic-based partial sensing and the first reservation period value. For instance, if the sidelink resource pool (pre-)configures period values P1, P2, P3, P4, P5 for periodic resource reservation and if the sidelink resource pool configures period values P1, P2, P3 for periodic-based partial sensing and if the first reservation period value is P4, the set of exclusion slots may be slots m+P1, m+P2, m+P3, m+P4.

In one embodiment, the first set of candidate slots may be a specific number of contiguous slots after the second slot. For instance, the first set of candidate slots may be slots [m+1, m+31].

In one embodiment, the set of exclusion slots may be a specific number of contiguous slots after the second slot. For instance, the set of exclusion slots may be slots [m+1, m+31].

In one embodiment, the specific number may be a specified value, e.g. 31. Preferably, the specific number may be (pre-)configured. The specific number may be derived/determined based on priority of the first sidelink data and/or remaining packet delay budget of the first sidelink data.

Method b

In general, the concept of method b is if the UE does not perform sensing in a second slot m after the first slot, the UE could exclude a second set of candidate sidelink resources from the candidate sidelink resources in the set of candidate slots. The second set of candidates may be derived/determined based on sidelink feedback channel detection in a feedback slot associated with the second slot m.

In one embodiment, the second slot m may be after the first slot and before the first candidate slot of the set of candidate slots. The second slot m may be within the time gap between the first slot n and the first candidate slot.

In one embodiment, the second slot m may be one slot/occasion of associated periodic sensing occasions. The second slot m may be a sensing slot for periodic-based partial sensing. Additionally or alternatively, the second slot m may be within the contiguous partial sensing window. The second slot m may be a sensing slot for contiguous partial sensing.

In one embodiment, the second set of candidate sidelink resources may be in a first set of candidate slots. The first set of candidate slots may be a subset of the set of candidate slots. In one embodiment, the UE may derive/determine the first set of candidate slots as intersection of a set of exclusion slots and the set of candidate slots.

In one embodiment, if the UE detects sidelink feedback channel associated with a sub-channel in frequency domain, the UE could exclude any candidate sidelink resources which are overlapped with the sub-channel and in the first set of candidate slots (in the sidelink resource pool). The second set of candidate sidelink resources may comprise the any candidate sidelink resources which are overlapped with the sub-channel (in frequency domain) and in the first set of candidate slots. Additionally or alternatively, if the UE does not detect sidelink feedback channel associated with another sub-channel(s) in frequency domain, the UE may not exclude any candidate sidelink resources which are fully overlapped with the another sub-channel(s) and in the (first) set of candidate slots. The second set of candidate sidelink resources may not comprise the any candidate sidelink resources which are fully overlapped with the another sub-channel(s) (in frequency domain) and in the (first) set of candidate slots.

In one embodiment, if the UE detects sidelink feedback channel associated with a sub-channel in frequency domain, and if a second candidate sidelink resource is overlapped with the sub-channel (in frequency domain) and in/within a set of exclusion slots, the UE could exclude the second candidate sidelink resource. The second candidate sidelink resource may be one candidate sidelink resource in the second set of candidate sidelink resources. The second candidate sidelink resource may be in/within the first set of candidate slots.

In one embodiment, the UE could exclude any candidate sidelink resource(s) if the any candidate sidelink resource(s) is overlapped with the sub-channel (in frequency domain) and in/within the set of exclusion slots and in/within the set of candidate slots. The second set of candidate sidelink resources may comprise the any candidate sidelink resources which is overlapped with the sub-channel (in frequency domain) and in/within the set of exclusion slots and in/within the set of candidate slots. The first set of candidate slots may be intersection of the set of exclusion slots and the set of candidate slots. The any candidate sidelink resource(s) may comprise at least the second candidate sidelink resource. Additionally or alternatively, if the UE does not detect sidelink feedback channel associated with another sub-channel(s) in frequency domain, the UE may not exclude any candidate sidelink resources which are fully overlapped with the another sub-channel(s) and in the set of exclusion slots. The second set of candidate sidelink resources may not comprise the any candidate sidelink resources which are fully overlapped with the another sub-channel(s) (in frequency domain) and in the set of exclusion slots.

Some possible embodiments about the first set of candidate slots and/or the set of exclusion slots are described below:

In one embodiment, the first set of candidate slots could be derived/determined based on the second slot and (all) period values (pre-)configured for the sidelink resource pool. For instance, if the sidelink resource pool (pre-)configures period values P1, P2, P3 for periodic resource reservation, the first set of candidate slots may be slots m+P1, m+P2, m+P3.

In one embodiment, the set of exclusion slots could be derived/determined based on the second slot and (all) period values (pre-)configured for the sidelink resource pool. For instance, if the sidelink resource pool (pre-)configures period values P1, P2, P3 for periodic resource reservation, the set of exclusion slots may be slots m+P1, m+P2, m+P3.

In one embodiment, the first set of candidate slots could be derived/determined based on the second slot and the configured set of period values for periodic-based partial sensing. For instance, if the sidelink resource pool (pre-)configures period values P1, P2, P3, P4, P5 for periodic resource reservation and if the sidelink resource pool configures period values P1, P2, P3 for periodic-based partial sensing, the first set of candidate slots may be slots m+P1, m+P2, m+P3.

In one embodiment, the set of exclusion slots could be derived/determined based on the second slot and the configured set of period values for periodic-based partial sensing. For instance, if the sidelink resource pool (pre-)configures period values P1, P2, P3, P4, P5 for periodic resource reservation and if the sidelink resource pool configures period values P1, P2, P3 for periodic-based partial sensing, the set of exclusion slots may be slots m+P1, m+P2, m+P3.

The UE may trigger/request the partial sensing-based resource (re-)selection for the one or more (valid/identified) sidelink resources with a first reservation period value.

In one embodiment, the first set of candidate slots could be derived/determined based on the second slot and the configured set of period values for periodic-based partial sensing and the first reservation period value. For instance, if the sidelink resource pool (pre-)configures period values P1, P2, P3, P4, P5 for periodic resource reservation and if the sidelink resource pool configures period values P1, P2, P3 for periodic-based partial sensing and if the first reservation period value is P4, the first set of candidate slots may be slots m+P1, m+P2, m+P3, m+P4.

In one embodiment, the set of exclusion slots could be derived/determined based on the second slot and the configured set of period values for periodic-based partial sensing and the first reservation period value. For instance, if the sidelink resource pool (pre-)configures period values P1, P2, P3, P4, P5 for periodic resource reservation and if the sidelink resource pool configures period values P1, P2, P3 for periodic-based partial sensing and if the first reservation period value is P4, the set of exclusion slots may be slots m+P1, m+P2, m+P3, m+P4.

In one embodiment, the first set of candidate slots may be a specific number of contiguous slots after the second slot. For instance, the first set of candidate slots may be slots [m+1, m+31].

In one embodiment, the set of exclusion slots may be a specific number of contiguous slots after the second slot. For instance, the set of exclusion slots may be slots [m+1, m+31].

In one embodiment, the specific number may be a specified value, e.g. 31. The specific number may be (pre-)configured. The specific number may be derived/determined based on priority of the first sidelink data and/or remaining packet delay budget of the first sidelink data.

In one embodiment, the UE may monitor (all) sidelink feedback resources in the feedback slot associated with the second slot m in the sidelink resource pool.

In one embodiment, the UE detecting a sidelink feedback channel may mean/comprise that the UE detects/receives a sidelink feedback channel/resource with a reference signal received power larger than a threshold. The UE not detecting a sidelink feedback channel may mean/comprise that the UE does not detect/receive a sidelink feedback channel/resource with a reference signal received power larger than a threshold.

In one embodiment, for (a sidelink feedback channel in) a sidelink feedback resource, the UE may derive/determine an associated sub-channel in frequency domain. The sub-channel may mean/represent/replace a scheduling/transmission unit, in frequency domain, for sidelink data transmission. The association may mean that if the UE performs a sidelink data transmission comprising at least the sub-channel, the UE may receive/detect/monitor sidelink HARQ feedback on the sidelink feedback resource (in response to the sidelink data transmission). The association may mean that if the UE receives a sidelink data transmission comprising at least the sub-channel, the UE may transmit sidelink HARQ feedback on the sidelink feedback resource (in response to the sidelink data transmission).

Method c

In general, the concept of method c is that the UE shall (keep) monitor slots of the associated periodic sensing occasions. Additionally or alternatively, the UE shall (keep) monitor the slots within the contiguous partial sensing window.

More specifically, if a second slot m is after the first slot and the second slot m is one slot of the associated periodic sensing occasion, the UE shall (keep) monitor the second slot m. The UE may not be allowed to not monitor the second slot m. Additionally or alternatively, if a second slot m is after the first slot and the second slot m is one slot within the contiguous partial sensing window, the UE shall (keep) monitor the second slot m. The UE may not be allowed to not monitor the second slot m.

In one embodiment, if a second slot m is after the first slot and the second slot m is one slot of the associated periodic sensing occasion, the UE shall (keep) monitor the second slot m, unless some condition occurs. The UE may not be allowed to not monitor the second slot m, unless some condition occurs. Additionally or alternatively, if a second slot m is after the first slot and the second slot m is one slot within the contiguous partial sensing window, the UE shall (keep) monitor the second slot m, unless some condition occurs. The UE may not be allowed to not monitor the second slot m, unless some condition occurs.

In one embodiment, the second slot m may be after the first slot and before the first candidate slot of the set of candidate slots. The second slot m may be within the time gap between the first slot n and the first candidate slot.

In one embodiment, the second slot m may be one slot/occasion of associated periodic sensing occasions. The second slot m may be a sensing slot for periodic-based partial sensing. Additionally or alternatively, the second slot m may be within the contiguous partial sensing window. The second slot m may be a sensing slot for contiguous partial sensing.

To achieve the concept of method c, there may be some embodiments (including the some conditions) as follows:

In one embodiment c1, assuming the first sidelink data is with a first sidelink data priority (value), the UE may (already) have/reserve/select a sidelink resource, in the second slot m, for transmitting a second sidelink data with a second sidelink data priority (value).

In one embodiment, if the first sidelink data priority is larger than or equal to the second sidelink data priority (e.g. the first sidelink data priority value is smaller than or equal to the second sidelink data priority value), the UE may drop/skip/withdraw/ignore sidelink transmission on the sidelink resource for transmitting the second sidelink data. The UE may monitor the second slot m (for the partial sensing-based resource (re-)selection), and may not perform sidelink transmission on the sidelink resource for transmitting the second sidelink data. The UE may trigger another sidelink resource reselection for the second sidelink data.

Additionally or alternatively, if the second sidelink data priority is larger than or equal to the first sidelink data priority (e.g. the second sidelink data priority value is smaller than or equal to the first sidelink data priority value), the UE may perform sidelink transmission on the sidelink resource for transmitting the second sidelink data. The UE may not monitor the second slot m (for the partial sensing-based resource (re-)selection). In this case, method a or b or embodiment c5 (described below) may be applied.

In one embodiment c2, assuming the first sidelink data is with a first sidelink data priority (value), the UE may (already) have/reserve/select a sidelink resource, in the second slot m, for transmitting a second sidelink data with a second sidelink data priority (value).

In one embodiment, if the sidelink resource is for sidelink retransmission for the second sidelink data (and/or if the first sidelink data priority is larger than or equal to the second sidelink data priority and/or if the first sidelink data priority value is smaller than or equal to the second sidelink data priority value), the UE may drop/skip/withdraw/ignore sidelink transmission on the sidelink resource for transmitting the second sidelink data. The UE may monitor the second slot m (for the partial sensing-based resource (re-)selection), and may not perform sidelink transmission on the sidelink resource for transmitting the second sidelink data. The UE may trigger another sidelink resource reselection for the second sidelink data.

Additionally or alternatively, if the sidelink resource is for sidelink initial transmission for the second sidelink data (and/or if the second sidelink data priority is larger than or equal to the first sidelink data priority and/or if the second sidelink data priority value is smaller than or equal to the first sidelink data priority value), the UE may perform sidelink transmission on the sidelink resource for transmitting the second sidelink data. The UE may not monitor the second slot m (for the partial sensing-based resource (re-)selection). In this case, method a or b or embodiment c5 (described below) may be applied.

In one embodiment c3, assuming the first sidelink data is with a first remaining packet delay budget, the UE may (already) have/reserve/select a sidelink resource, in the second slot m, for transmitting a second sidelink data with a second remaining packet delay budget.

In one embodiment, if (the ending of) the first remaining packet delay budget is earlier than (the ending of) the second remaining packet delay budget, the UE may drop/skip/withdraw/ignore sidelink transmission on the sidelink resource for transmitting the second sidelink data. The UE may monitor the second slot m (for the partial sensing-based resource (re-)selection) and not perform sidelink transmission on the sidelink resource for transmitting the second sidelink data. The UE may trigger another sidelink resource reselection for the second sidelink data.

Additionally or alternatively, if (the ending of) the second remaining packet delay budget is earlier than (the ending of) the first remaining packet delay budget, the UE may perform sidelink transmission on the sidelink resource for transmitting the second sidelink data. The UE may not monitor the second slot m (for the partial sensing-based resource (re-)selection). In this case, method a or b or embodiment c5 (described below) may be applied.

In one embodiment c4, assuming the first sidelink data is with a first sidelink data priority (value), the UE may (already) be scheduled/triggered to perform an uplink control or data transmission for transmitting an uplink data or uplink control information in the second slot m (in the carrier/cell). If the UE performs the uplink control or data transmission, the UE may not be able to monitor the second slot m (for the partial sensing-based resource (re-) selection).

In one embodiment, if the first sidelink data priority is larger than a sidelink priority threshold (e.g. the first sidelink data priority value is smaller than a sidelink priority threshold value), the UE may drop/skip/withdraw/ignore the uplink control or data transmission. The UE may monitor the second slot m (for the partial sensing-based resource (re-)selection). The UE may not perform the uplink control or data transmission.

Additionally or alternatively, if the first sidelink data priority is lower than the sidelink priority threshold (e.g. the first sidelink data priority value is larger than the sidelink priority threshold value), the UE may perform the uplink control or data transmission. The UE may not monitor the second slot m (for the partial sensing-based resource (re-)selection). In this case, method a or b or embodiment c5 (described below) may be applied.

In one embodiment, if the first sidelink data priority is larger than or equal to priority of the uplink data or the uplink control information (e.g. the first sidelink data priority value is smaller than or equal to priority value of the uplink data or the uplink control information), the UE may drop/skip/withdraw/ignore the uplink control or data transmission. The UE may monitor the second slot m (for the partial sensing-based resource (re-)selection), and may not perform the uplink control or data transmission. The priority value of the uplink data or the uplink control information may be derived/determined based on sidelink information (e.g. sidelink HARQ information) carried/delivered in the uplink data or the uplink control information.

Additionally or alternatively, if the first sidelink data priority is lower than priority of the uplink data or the uplink control information (e.g. the first sidelink data priority value is larger than or equal to priority value of the uplink data or the uplink control information), the UE may perform the uplink control or data transmission. The UE may not monitor the second slot m (for the partial sensing-based resource (re-)selection). In this case, method a or b or embodiment c5 (described below) may be applied. The priority value of the uplink data or the uplink control information may be derived/determined based on sidelink information (e.g. sidelink HARQ information) carried/delivered in the uplink data or the uplink control information.

In one embodiment c5, assuming the UE does not monitor the second slot m.

In one embodiment, the UE may update or re-derive or re-determine a new set of candidate slots. More specifically, the UE may update or re-derive or re-determine a new set of candidate slots, in response to not monitor the second slot m (, which is one periodic sensing occasion associated with the set of candidate slots). The UE may update or re-derive or re-determine the new set of candidate slots based on at least (part of) periodic sensing occasions before the second slot m. The UE may update or re-derive or re-determine the new set of candidate slots based on at least (part of) periodic sensing occasions before the first slot n and (part of) periodic sensing occasions between the first slot n and the second slot m. The new set of candidate slots may be within the resource selection window, e.g. $[n+T_1, n+T_2]$. Additionally or alternatively, the new set of candidate slots may be within a new resource selection window, e.g. $[n+T_{1\_new}, n+T_{2\_new}]$ or $[m+T_{1\_new}, m+T_{2\_new}]$. $T_{1\_new}$ may be the same or different from $T_1$. $T_{2\_new}$ may be the same or different from $T_2$. The first candidate slot of the new set of candidate slots may be denoted as $t_{y0\_new}$.

In one embodiment, the UE may update or re-derive or re-determine a new contiguous partial sensing window. More specifically, the UE may update or re-derive or re-determine a new contiguous partial sensing window, in response to not monitor the second slot m (, which is one slot within the contiguous partial sensing window). The UE may update or re-derive or re-determine the new contiguous partial sensing window based on sensing/sensed/monitored slots before the second slot m. The UE may update or re-derive or re-determine the new contiguous partial sensing window based on the new set of candidate slots. The new contiguous partial sensing window may mean a time interval $[n+T_{A\_new}, n+T_{B\_new}]$ or $[m+T_{A\_new}, m+T_{B\_new}]$ Additionally or alternatively, the time interval $[n+T_{A\_new}, n+T_{B\_new}]$ or $[m+T_{A\_new}, m+T_{B\_new}]$ may be referred to some of the new set of candidate slots, e.g. the first candidate slot of the new set of candidate slots. In one instance, the time interval $[n+T_{A\_new}, n+T_{B\_new}]$ or $[m+T_{A\_new}, m+T_{B\_new}]$ may be replaced/represented/changed as $[t_{y0\_new}-T'_{A\_new}, t_{y0\_new}-T'_{B\_new}]$. $T_{A\_new}$ may be the same or different from $T_A$. $T_{B\_new}$ may be the same or different from $T_B$. $T'_{A\_new}$ may be the same or different from $T'_A$ $T'_{B\_new}$ may be the same or different from $T'_B$. $T_{A\_new}$ may be larger than zero.

In one embodiment, the UE may monitor (slots of) new periodic sensing occasions associated with the new set of candidate slots. The UE may monitor slots within the new contiguous partial sensing window. The UE may derive/determine a set of (valid/identified) sidelink resources, from candidate sidelink resources in the new set of candidate slots. The UE may derive/determine a set of (valid/identified) sidelink resources, from the candidate sidelink resources in the new set of candidate slots, based on sensing result of (all) the new periodic sensing occasions and/or the slots within the new contiguous partial sensing window.

The set of (valid/identified) sidelink resources may be reported to higher layers of the UE. (The higher layers of) the UE may select the one or more (valid/identified) sidelink resources from the set of (valid/identified) sidelink resources. The UE may perform one or more sidelink transmission in the one or more (valid/identified) sidelink resources for transmitting the first sidelink data.

For all Above Concepts, Methods, Alternatives and Embodiments:

Note that any of above methods, alternatives and embodiments may be combined or applied simultaneously.

In one embodiment, the UE not performing sensing in the second slot m may mean that the UE performs sidelink transmission or uplink transmission in the second slot m in the carrier/cell. Also, the UE not performing sensing in the second slot m may mean that the UE is in sidelink DRX non-active time in the second slot m (in the carrier/cell).

In one embodiment, (time unit of) a periodic sensing occasion may be/mean a slot. Time unit of the contiguous partial sensing window may be a slot.

In one embodiment, $T_1$ may be positive value. $T_1$ may be defined in the same way as in R16 NR-V2X as discussed in 3GPP TS 38.214 (in response to the first slot n). $T_2$ may be positive value. $T_2$ may be defined in the same way as in R16 NR-V2X (as discussed in 3GPP 38.214) (in response to the first slot n). $T_{1\_new}$ may be positive value. $T_{1\_new}$ may be defined in the same way as in R16 NR-V2X as discussed in 3GPP TS 38.214 (in response to the second slot m). $T_{2\_new}$ may be positive value. $T_{2\_new}$ may be defined in the same way as in R16 NR-V2X (as discussed in 3GPP 38.214) (in response to the second slot m).

In one embodiment, $T_A$ may be zero, positive or negative value. $T_A$ value or range may depend on different operating scenarios or conditions (in response to the first slot n). $T_B$ may be zero, positive or negative value. $T_B$ value or range may depend on different operating scenarios or conditions (in response to the first slot n). $T_{A\_new}$ may be zero, positive or negative value. $T_{A\_new}$ value or range may depend on different operating scenarios or conditions (in response to the second slot m). $T_{B\_new}$ may be zero, positive or negative value. $T_{B\_new}$ value or range may depend on different operating scenarios or conditions (in response to the second slot m).

In one embodiment, $T'_A$ may be positive value. $T'_A$ value or range may depend on different operating scenarios or conditions (in response to the first slot n). $T'_B$ may be positive value. $T'_B$ value or range may depend on different operating scenarios or conditions (in response to the first slot n). $T'_{A\_new}$ may be positive value. $T'_{A\_new}$ value or range may depend on different operating scenarios or conditions (in response to the second slot m). $T'_{B\_new}$ may be positive value. $T'_{B\_new}$ value or range may depend on different operating scenarios or conditions (in response to the second slot m).

In one embodiment, the sidelink transmission from the UE may be/mean PSSCH transmission. The sidelink transmission from the UE may be device-to-device transmission.

In one embodiment, monitoring a slot may mean/comprise that the UE monitors/receives/detect (all) sidelink control information (SCI) in the slot in the sidelink resource pool. The sidelink control information may be delivered at least in PSCCH. The sidelink control information may comprise 1st stage SCI. The 1st stage SCI may be transmitted via PSCCH. The sidelink control information may comprise 2nd stage SCI. The 2nd stage SCI may be transmitted via multiplexed with PSSCH. The SCI format 1 is 1st stage SCI. The SCI format 2-A is a 2nd stage SCI. Preferably, the SCI format 2-B is a 2nd stage SCI.

In one embodiment, the slot may mean a sidelink slot. The slot may be represented/replaced as a TTI.

In one embodiment, the sidelink slot may mean slot for sidelink. A TTI may be a subframe (for sidelink) or slot (for sidelink) or sub-slot (for sidelink). A TTI may comprise multiple symbols, e.g. 12 or 14 symbols. A TTI may be a slot (fully/partially) comprising sidelink symbols. A TTI may mean a transmission time interval for a sidelink (data) transmission. A sidelink slot or a slot for sidelink may contain all OFDM symbols available for sidelink transmission. A sidelink slot or a slot for sidelink may contain a consecutive number symbols available for sidelink transmission. A sidelink slot or a slot for sidelink means that a slot is included/comprised in a sidelink resource pool.

In one embodiment, the symbol may mean a symbol indicated/configured for sidelink. The slot may mean/comprise sidelink slot associated with the sidelink resource pool. The slot may not mean/comprise a sidelink slot associated with other sidelink resource pool.

In one embodiment, the contiguous slots may mean contiguous sidelink slots in/for the sidelink resource pool. The contiguous slots may or may not be contiguous in physical slots. It may mean that the contiguous slots in the sidelink resource pool may be not contiguous from the aspect of physical slot. The contiguous slots may or may not be contiguous in sidelink slots in/for a sidelink BWP or a sidelink carrier/cell. It may mean that the contiguous slots in the sidelink resource pool may be not contiguous from the aspect of sidelink slots in a sidelink BWP or a sidelink carrier/cell. There may be one or more sidelink resource pools in a sidelink BWP or a sidelink carrier/cell.

In one embodiment, the UE may (trigger/request to) perform the partial sensing-based resource (re-)selection, when/if the UE requires sidelink resource(s) for delivering/transmitting the first sidelink data. The (first) sidelink data may mean a transport block (TB). Preferably, the (first) sidelink data may mean/be a MAC PDU. The (first) sidelink data may mean a (first) data packet. The (first) sidelink data may be associated with at least a sidelink logical channel. The (first) sidelink data may comprise data from at least a sidelink logical channel.

In one embodiment, a sub-channel may be a unit for sidelink resource allocation/scheduling (for PSSCH). A sub-channel may comprise multiple contagious PRBs in frequency domain. the number of PRBs for each sub-channel may be (pre-)configured for a sidelink resource pool. A sidelink resource pool (pre-)configuration may indicate/configure the number of PRBs for each sub-channel. The number of PRBs for each sub-channel may be any of 4, 5, 6, 8, 9, 10, 12, 15, 16, 18, 20, 25, 30, 48, 50, 72, 75, 96, 100. A sub-channel may be represented as a unit for sidelink resource allocation/scheduling. A sub-channel may mean a PRB. Preferably, a sub-channel may mean a set of consecutive PRBs in frequency domain. A sub-channel may mean a set of consecutive resource elements in frequency domain.

In one embodiment, the (reservation) period value may be in unit of millisecond. The (reservation) period value may be (converted/changed) in unit of slot for deriving/determining the associated periodic sensing occasion(s).

In one embodiment, the UE may acquire resource reservation information from other UE(s) via received SCI from the other UE(s). The SCI from other UE(s) may include resource reservation information of the other UE.

In one embodiment, the first sidelink data may be for a second UE. The UE could perform the one or more sidelink transmission in the one or more (valid/identified) sidelink resources for transmitting the first sidelink data to the second UE. The second sidelink data may be for a third UE. The third UE may be the same or different from the second UE.

In one embodiment, the first sidelink data may be for a second sidelink group. The UE could perform the one or more sidelink transmission in the one or more (valid/identified) sidelink resources for transmitting the first sidelink data to the second sidelink group. The second sidelink data may be for a third sidelink group. The third sidelink group may be the same or different from the second sidelink group.

In one embodiment, the UE may determine/derive the set of candidate slots and/or the resource selection window based on sidelink active time of the second UE, e.g., the set of candidate slots and/or the resource selection window is (restricted/limited) within the sidelink active time of the second UE. The UE may determine/derive the set of candidate slots and/or the resource selection window based on sidelink DRX configuration for the second UE. Additionally or alternatively, the UE may determine/derive the set of candidate slots and/or the resource selection window based on sidelink DRX configuration for the UE. The UE may determine/derive the set of candidate slots and/or the resource selection window based on sidelink DRX configuration for the sidelink link/connection between the UE and the second UE. The UE may determine/derive the set of candidate slots and/or the resource selection window based on sidelink DRX configuration for the second sidelink group.

In one embodiment, the UE may have/maintain/establish multiple sidelink links/connections on PC5 interface. For different sidelink links/connections, the UE may perform sidelink transmission/reception to/from different paired UE(s).

In one embodiment, the UE may have/maintain/establish a first sidelink link/connection and a second sidelink link/connection. The paired UE of the first sidelink link/connection may be different from the paired UE of the second sidelink link/connection. The sidelink logical channel(s) associated with (the paired UE of) the first sidelink link/connection may be separate/independent from the sidelink logical channel(s) associated with (the paired UE of) the second sidelink link/connection.

In one embodiment, the UE may be/mean/comprise/replace a device. The sidelink transmission/reception may be UE-to-UE transmission/reception. The sidelink transmission/reception may be device-to-device transmission/reception. The sidelink transmission/reception may be V2X transmission/reception. The sidelink transmission/reception may be P2X transmission/reception. The sidelink transmission/reception may be on PC5 interface.

In one embodiment, the PC5 interface may be wireless interface for communication between device and device. The PC5 interface may be wireless interface for communication between devices. The PC5 interface may be wireless interface for communication between UEs. The PC5 interface may be wireless interface for V2X or P2X communication. The Uu interface may be wireless interface for communication between network node and device. The Uu interface may be wireless interface for communication between network node and UE.

In one embodiment, the UE may be a first device or a first UE. Preferably, the first device may be a vehicle UE. The first device may be a V2X UE. The second UE may be a second device. The second device may be a vehicle UE. The second device may be a V2X UE. The first UE and the second device may be different devices. The third UE may be a third device. The third device may be a vehicle UE. The third device may be a V2X UE. The first UE and the third device may be different devices.

Figure 13:
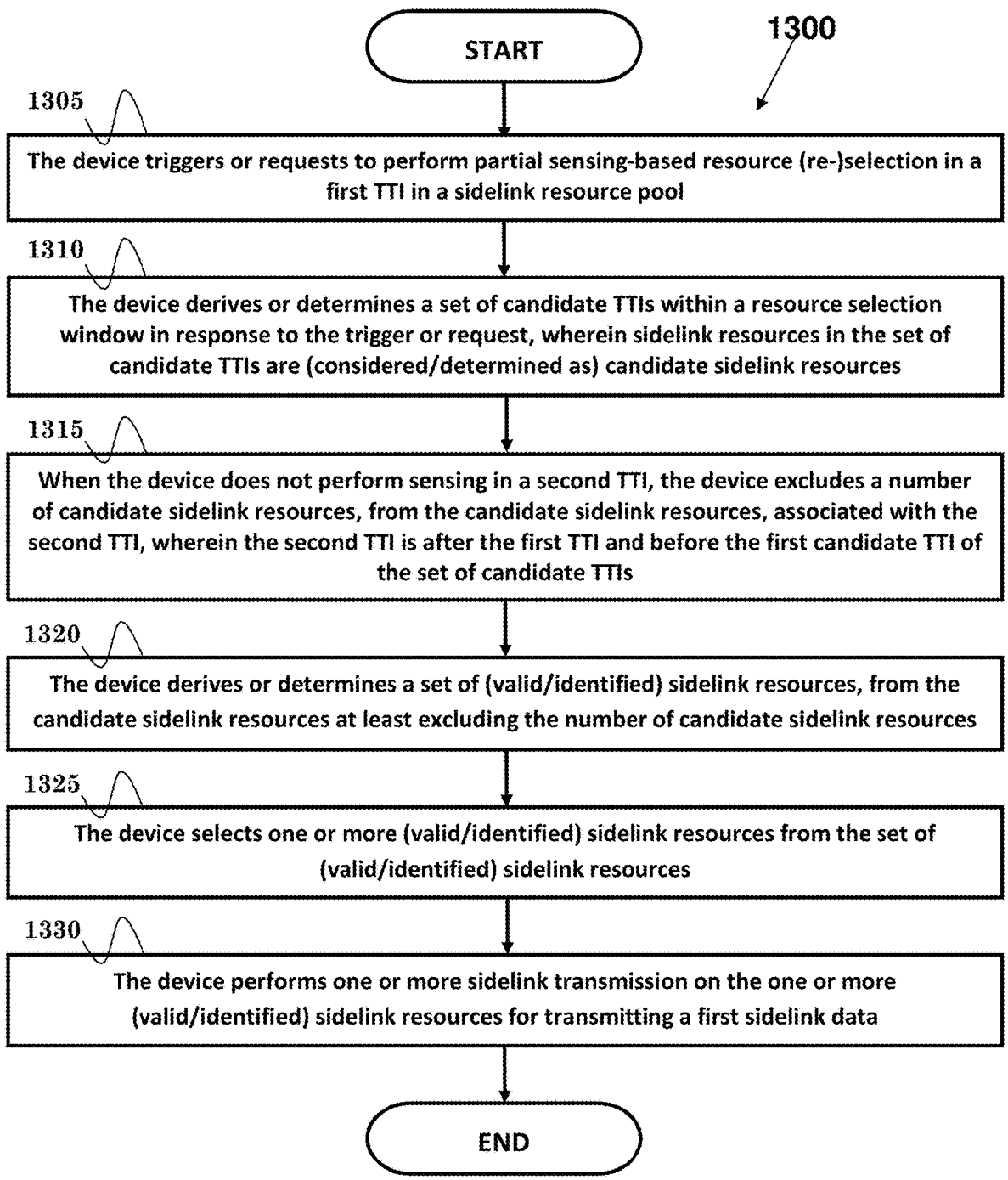
FIG. 13 is a flow chart according to one exemplary embodiment.

FIG. 13 is a flow chart 1300 according to one exemplary embodiment of a device to perform sidelink communication. In step 1305, the device triggers or requests to perform partial sensing-based resource (re-)selection in a first TTI in a sidelink resource pool. In step 1310, the device derives or determines a set of candidate TTIs within a resource selection window in response to the trigger or request, wherein sidelink resources in the set of candidate TTIs are (considered/determined as) candidate sidelink resources. In step 1315, when the device does not perform sensing in a second TTI, the device excludes a number of candidate sidelink resources, from the candidate sidelink resources, associated with the second TTI, wherein the second TTI is after the first TTI and before the first candidate TTI of the set of candidate TTIs. In step 1320, the device derives or determines a set of (valid/identified) sidelink resources, from the candidate sidelink resources at least excluding the number of candidate sidelink resources. In step 1325, the device selects one or more (valid/identified) sidelink resources from the set of (valid/identified) sidelink resources. In step 1330, the device performs one or more sidelink transmission on the one or more (valid/identified) sidelink resources for transmitting a first sidelink data.

In one embodiment, the device could derive or determine a number of exclusion TTIs based on the second TTI. The device could exclude any candidate sidelink resource in the number of exclusion TTIs. The device could exclude all candidate sidelink resources in the number of exclusion TTIs. The number of candidate sidelink resources may be all candidate sidelink resources in the number of exclusion TTIs.

In one embodiment, the device could derive or determine a number of candidate TTIs which is intersection of the number of exclusion TTIs and the set of candidate TTIs. The device could exclude any candidate sidelink resource in the number of candidate TTIs. The device could exclude all candidate sidelink resources in the number of candidate TTIs. The number of candidate sidelink resources are all candidate sidelink resources in the number of candidate TTIs.

In one embodiment, the number of exclusion TTIs could be derived or determined based on the second TTI and period values (pre-)configured for the sidelink resource pool. The number of exclusion TTIs could be derived or determined based on the second TTI and (pre-) configured period values for periodic-based partial sensing.

In one embodiment, the device could trigger or request the partial sensing-based resource (re-)selection for acquiring sidelink resources with a first reservation period value. The number of exclusion TTIs could be derived or determined based on the second TTI and (pre-) configured period values for periodic-based partial sensing and the first reservation period value.

In one embodiment, the second TTI may be one TTI or occasion of periodic sensing occasions associated with the set of candidate TTIs. The second TTI may be a sensing TTI for periodic-based partial sensing. The periodic sensing occasions, and/or the sensing TTI for periodic-based partial sensing, and/or the second TTI may be utilized for performing the partial sensing-based resource (re-)selection, not for performing re-evaluation or pre-emption.

In one embodiment, the device could perform a sidelink transmission or an uplink transmission in the second TTI. Furthermore, the device could perform the sidelink transmission or the uplink transmission in a carrier or cell which the sidelink resource pool is in.

In one embodiment, when the device performs sensing in a third TTI, the device could perform the partial sensing-based resource (re-)selection based on at least sensing result in the third TTI, wherein the third TTI is after the first TTI and before the first candidate TTI of the set of candidate TTIs. The third TTI may be one TTI or occasion of periodic sensing occasions associated with the set of candidate TTIs. The third TTI may be a sensing TTI for periodic-based partial sensing. When the device receives or detects a sidelink control signaling in the third TTI, the device could exclude some candidate resources, from the candidate sidelink resources, according to the received control signaling.

Referring back to FIGS. 3 and 4, in one exemplary embodiment of a device. The network 300 includes a program code 312 stored in the memory 310. The CPU 308 could execute program code 312 to enable the device (i) to trigger or request to perform partial sensing-based resource (re-)selection in a first TTI in a sidelink resource pool, (ii) to derive or determine a set of candidate TTIs within a resource selection window in response to the trigger or request, wherein sidelink resources in the set of candidate TTIs are (considered/determined as) candidate sidelink resources, (iii) to exclude a number of candidate sidelink resources associated with the second TTI from the candidate sidelink resources when the device does not perform sensing in a second TTI, wherein the second TTI is after the first TTI and before the first candidate TTI of the set of candidate TTIs, (iv) to derive or determine a set of (valid/identified) sidelink resources, from the candidate sidelink resources at least excluding the number of candidate sidelink resources, (v) to select one or more (valid/identified) sidelink resources from the set of (valid/identified) sidelink resources, and (vi) to perform one or more sidelink transmission on the one or more (valid/identified) sidelink resources for transmitting a first sidelink data. Furthermore, the CPU 308 can execute the program code 312 to perform all of the above-described actions and steps or others described herein.

Figure 14:
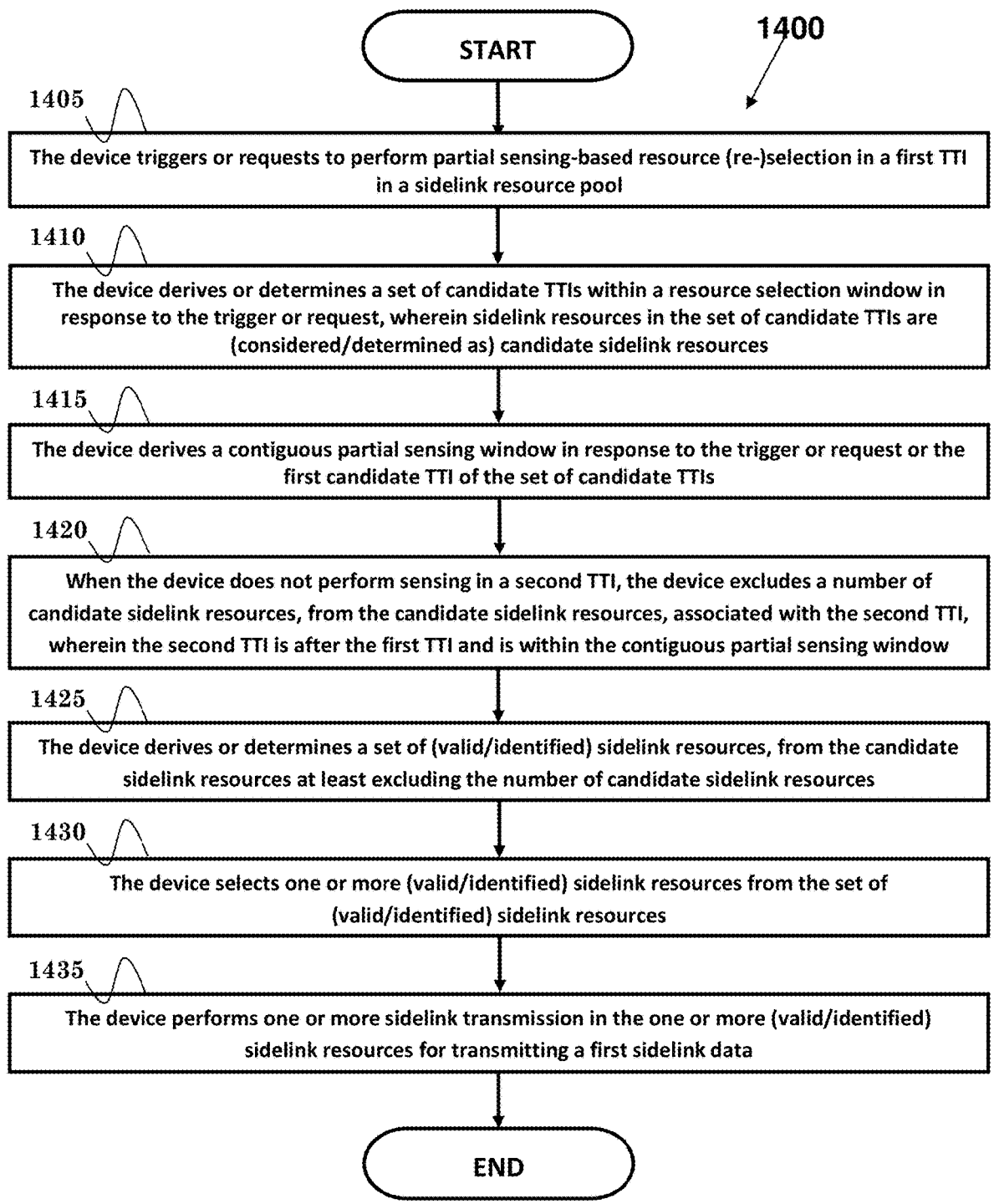
FIG. 14 is a flow chart according to one exemplary embodiment.

FIG. 14 is a flow chart 1400 according to one exemplary embodiment of a device to perform sidelink communication. In step 1405, the device triggers or requests to perform partial sensing-based resource (re-)selection in a first TTI in a sidelink resource pool. In step 1410, the device derives or determines a set of candidate TTIs within a resource selection window in response to the trigger or request, wherein sidelink resources in the set of candidate TTIs are (considered/determined as) candidate sidelink resources. In step 1415, the device derives a contiguous partial sensing window in response to the trigger or request or the first candidate TTI of the set of candidate TTIs. In step 1420, when the device does not perform sensing in a second TTI, the device excludes a number of candidate sidelink resources, from the candidate sidelink resources, associated with the second TTI, wherein the second TTI is after the first TTI and is within the contiguous partial sensing window. In step 1425, the device derives or determines a set of (valid/identified) sidelink resources, from the candidate sidelink resources at least excluding the number of candidate sidelink resources. In step 1430, the device selects one or more (valid/identified) sidelink resources from the set of (valid/identified) sidelink resources. In step 1435, the device performs one or more sidelink transmission in the one or more (valid/identified) sidelink resources for transmitting a first sidelink data.

In one embodiment, the device could derive or determine a number of exclusion TTIs based on the second TTI. The device could exclude any candidate sidelink resource in the number of exclusion TTIs. The device could exclude all candidate sidelink resources in the number of exclusion TTIs. The number of candidate sidelink resources may be all candidate sidelink resources in the number of exclusion TTIs.

In one embodiment, the device could derive or determine a number of candidate TTIs which is intersection of the number of exclusion TTIs and the set of candidate TTIs. The device could exclude any candidate sidelink resource in the number of candidate TTIs. The device could exclude all candidate sidelink resources in the number of candidate TTIs. The number of candidate sidelink resources may be all candidate sidelink resources in the number of candidate TTIs.

In one embodiment, the number of exclusion TTIs may be a specific number of contiguous TTIs after the second TTI, and/or the specific number is a configured value, or specified value, or derived or determined based on priority of the first sidelink data and/or remaining packet delay budget of the first sidelink data. The number of exclusion TTIs could be derived or determined based on the second TTI and period values (pre-)configured for the sidelink resource pool. The number of exclusion TTIs could be derived or determined based on the second TTI and (pre-)configured period values for periodic-based partial sensing.

In one embodiment, the second TTI may be one TTI or occasion of contiguous partial sensing associated with the first candidate TTI of the set of candidate TTIs. The second TTI may be a sensing TTI for contiguous partial sensing. The TTI or occasion of contiguous partial sensing, and/or the sensing TTI for contiguous partial sensing, and/or the second TTI could be utilized for performing the partial sensing-based resource (re-)selection, not for performing re-evaluation/pre-emption.

In one embodiment, the device could perform a sidelink transmission or an uplink transmission in the second TTI. The device could perform the sidelink transmission or the uplink transmission in a carrier or cell which the sidelink resource pool is in.

In one embodiment, when the device performs sensing in a third TTI, the device could perform the partial sensing-based resource (re-)selection based on at least sensing result in the third TTI, wherein the third TTI is after the first TTI and is within the contiguous partial sensing window. The third TTI may be an occasion or sensing TTI for contiguous partial sensing. When the device receives or detects a sidelink control signaling in the third TTI, the device could exclude some candidate resources, from the candidate sidelink resources, according to the received control signaling.

Referring back to FIGS. 3 and 4, in one exemplary embodiment of a device. The network 300 includes a program code 312 stored in the memory 310. The CPU 308 could execute program code 312 to enable the device (i) to trigger or request to perform partial sensing-based resource (re-)selection in a first TTI in a sidelink resource pool, (ii) to derive or determine a set of candidate TTIs within a resource selection window in response to the trigger or request, wherein sidelink resources in the set of candidate TTIs are (considered/determined as) candidate sidelink resources, (iii) to derive a contiguous partial sensing window in response to the trigger or request or the first candidate TTI of the set of candidate TTIs, (iv) to exclude a number of candidate sidelink resources associated with the second TTI from the candidate sidelink resources when the device does not perform sensing in a second TTI, wherein the second TTI is after the first TTI and is within the contiguous partial sensing window, (v) to derive or determine a set of (valid/identified) sidelink resources, from the candidate sidelink resources at least excluding the number of candidate sidelink resources, (vi) to select one or more (valid/identified) sidelink resources from the set of (valid/identified) sidelink resources, and (vii) to perform one or more sidelink transmission in the one or more (valid/identified) sidelink resources for transmitting a first sidelink data. Furthermore, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a device to perform sidelink communication, comprising:
   the device triggers or requests to perform partial sensing-based resource selection in a first Transmission Time Interval (TTI) in a sidelink resource pool;
   the device derives or determines a set of candidate TTIs within a resource selection window in response to the trigger or request, wherein sidelink resources in the set of candidate TTIs are candidate sidelink resources;
   when the device does not perform sensing in a second TTI, the device excludes a number of candidate sidelink resources, from the candidate sidelink resources, associated with the second TTI, wherein the second TTI is after the first TTI and before the first candidate TTI of the set of candidate TTIs;
   when the device performs sensing in a third TTI, the device performs the partial sensing-based resource selection based on at least sensing result in the third TTI, wherein:
      the third TTI is after the first TTI and before the first candidate TTI of the set of candidate TTIs, and/or
      the third TTI is one TTI or occasion of periodic sensing occasions associated with the set of candidate TTIs, and/or
      the third TTI is a sensing TTI for periodic-based partial sensing, and/or
      when the device receives or detects a sidelink control signaling in the third TTI, the device excludes some candidate resources, from the candidate sidelink resources, according to the received or detected sidelink control signaling;

the device derives or determines a set of sidelink resources, from the candidate sidelink resources at least excluding the number of candidate sidelink resources;

the device selects one or more sidelink resources from the set of sidelink resources; and the device performs one or more sidelink transmission on the one or more sidelink resources for transmitting a first sidelink data.

2. The method of claim 1, wherein the device derives or determines a number of exclusion TTIs based on the second TTI.

3. The method of claim 1, wherein the device excludes any candidate sidelink resource in the number of exclusion TTIs, and/or the device excludes all candidate sidelink resources in the number of exclusion TTIs, and/or the number of candidate sidelink resources are all candidate sidelink resources in the number of exclusion TTIs.

4. The method of claim 2, wherein the device derives or determines a number of candidate TTIs which is intersection of the number of exclusion TTIs and the set of candidate TTIs.

5. The method of claim 4, wherein the device excludes any candidate sidelink resource in the number of candidate TTIs, and/or the device excludes all candidate sidelink resources in the number of candidate TTIs, and/or the number of candidate sidelink resources are all candidate sidelink resources in the number of candidate TTIs.

6. The method of claim 2, wherein the number of exclusion TTIs is derived or determined based on the second TTI and period values configured for the sidelink resource pool, and/or the number of exclusion TTIs is derived or determined based on the second TTI and configured period values for periodic-based partial sensing.

7. The method of claim 2, wherein the device triggers or requests the partial sensing-based resource selection for acquiring sidelink resources with a first reservation period value, and the number of exclusion TTIs is derived or determined based on the second TTI and configured period values for periodic-based partial sensing and the first reservation period value.

8. The method of claim 1, wherein the second TTI is one TTI or occasion of periodic sensing occasions associated with the set of candidate TTIs, and/or the second TTI is a sensing TTI for periodic-based partial sensing, and/or the periodic sensing occasions, and/or the sensing TTI for periodic-based partial sensing, and/or the second TTI is utilized for performing the partial sensing-based resource selection, not for performing re-evaluation or pre-emption.

9. The method of claim 1, wherein the device performs a sidelink transmission or an uplink transmission in the second TTI, and/or the device performs the sidelink transmission or the uplink transmission in a carrier or cell which the sidelink resource pool is in.

10. A method of a device to perform sidelink communication, comprising:

the device triggers or requests to perform partial sensing-based resource selection in a first Transmission Time Interval (TTI) in a sidelink resource pool;

the device derives or determines a set of candidate TTIs within a resource selection window in response to the trigger or request, wherein sidelink resources in the set of candidate TTIs are candidate sidelink resources;

the device derives a contiguous partial sensing window in response to the trigger or request or the first candidate TTI of the set of candidate TTIs;

when the device does not perform sensing in a second TTI, the device excludes a number of candidate sidelink resources, from the candidate sidelink resources, associated with the second TTI, wherein the second TTI is after the first TTI and is within the contiguous partial sensing window;

when the device performs sensing in a third TTI, the device performs the partial sensing-based resource (re-)selection based on at least sensing result in the third TTI, wherein:

the third TTI is after the first TTI and is within the contiguous partial sensing window, and/or the third TTI is an occasion or sensing TTI for contiguous partial sensing, and/or when the device receives or detects a sidelink control signaling in the third TTI, the device excludes some candidate resources, from the candidate sidelink resources, according to the received or detected sidelink control signaling the device derives or determines a set of sidelink resources, from the candidate sidelink resources at least excluding the number of candidate sidelink resources;

the device selects one or more sidelink resources from the set of sidelink resources; and the device performs one or more sidelink transmission in the one or more sidelink resources for transmitting a first sidelink data.

11. The method of claim 10, wherein the device derives or determines a number of exclusion TTIs based on the second TTI.

12. The method of claim 11, wherein the device excludes any candidate sidelink resource in the number of exclusion TTIs, and/or the device excludes all candidate sidelink resources in the number of exclusion TTIs, and/or the number of candidate sidelink resources are all candidate sidelink resources in the number of exclusion TTIs.

13. The method of claim 11, wherein the device derives or determines a number of candidate TTIs which is intersection of the number of exclusion TTIs and the set of candidate TTIs.

14. The method of claim 13, wherein the device excludes any candidate sidelink resource in the number of candidate TTIs, and/or the device excludes all candidate sidelink resources in the number of candidate TTIs, and/or the number of candidate sidelink resources are all candidate sidelink resources in the number of candidate TTIs.

15. The method of claim 11, wherein the number of exclusion TTIs is a specific number of contiguous TTIs after the second TTI, and/or the specific number is a configured value, or specified value, or derived or determined based on priority of the first sidelink data and/or remaining packet delay budget of the first sidelink data.

16. The method claim 11, wherein the number of exclusion TTIs is derived or determined based on the second TTI and period values configured for the sidelink resource pool, and/or the number of exclusion TTIs is derived or determined based on the second TTI and configured period values for periodic-based partial sensing.

17. The method of claim 10, wherein the second TTI is one TTI or occasion of contiguous partial sensing associated with the first candidate TTI of the set of candidate TTIs, and/or the second TTI is a sensing TTI for contiguous partial sensing, and/or the TTI or occasion of contiguous partial sensing, and/or the sensing TTI for contiguous partial sensing, and/or the second TTI is utilized for performing the partial sensing-based resource selection, not for performing re-evaluation/pre-emption.

18. The method of claim 10, wherein the device performs a sidelink transmission or an uplink transmission in the second TTI, and/or wherein the device performs the sidelink transmission or the uplink transmission in a carrier or cell which the sidelink resource pool is in.

* * * * *